United States Patent
Jaisawal

(10) Patent No.: US 11,729,084 B1
(45) Date of Patent: Aug. 15, 2023

(54) MULTI-NODE SYSTEM MONITORING USING SYSTEM MONITORING LEDGERS FOR PRIMARY MONITORED NODES

(71) Applicant: Optum, Inc., Minnetonka, MN (US)

(72) Inventor: Sudheer Jaisawal, Gorakhpur (IN)

(73) Assignee: Optum, Inc., Minnetonka, MN (US)

( * ) Notice: Subject to any disclaimer, the term of this patent is extended or adjusted under 35 U.S.C. 154(b) by 0 days.

(21) Appl. No.: 17/810,490

(22) Filed: Jul. 1, 2022

(51) Int. Cl.
  *G06F 15/173* (2006.01)
  *H04L 43/10* (2022.01)
  *H04L 41/0893* (2022.01)
  *H04L 9/08* (2006.01)
  *H04L 9/00* (2022.01)

(52) U.S. Cl.
  CPC .............. *H04L 43/10* (2013.01); *H04L 9/088* (2013.01); *H04L 9/50* (2022.05); *H04L 41/0893* (2013.01)

(58) Field of Classification Search
  None
  See application file for complete search history.

(56) References Cited

U.S. PATENT DOCUMENTS

| | | | |
|---|---|---|---|
| 10,735,182 | B2 | 8/2020 | Jutla et al. |
| 10,991,457 | B1 | 4/2021 | Hallemeier et al. |
| 2010/0223078 | A1 | 9/2010 | Willis et al. |
| 2013/0090948 | A1 | 4/2013 | Upadhyayula et al. |
| 2015/0254754 | A1 | 9/2015 | Lang et al. |
| 2019/0266597 | A1 | 8/2019 | Mohtar |
| 2019/0304024 | A1 | 10/2019 | Colley et al. |
| 2019/0378094 | A1 | 12/2019 | Quinn |
| 2020/0019946 | A1 | 1/2020 | Walker et al. |
| 2020/0273578 | A1* | 8/2020 | Kutzko ................. G06N 20/00 |

(Continued)

FOREIGN PATENT DOCUMENTS

KR    10-2020-0088708 A    7/2020

OTHER PUBLICATIONS

"Blockchain & Group Benefit Coordination," Cookhouse Labs, (15 pages), (online), [Retrieved from the Internet Aug. 11, 2022] <URL: https://cookhouselabs.com/blockchain-group-benefit-coordination/>.

(Continued)

*Primary Examiner* — Atta Khan
(74) *Attorney, Agent, or Firm* — Alston & Bird LLP

(57) ABSTRACT

Various embodiments of the present invention provide methods, apparatus, systems, computing devices, computing entities, and/or the like for enabling low-bottleneck system-wide monitoring of a multi-node blockchain network by using a service monitoring ledger to describe monitoring nodes associated with a primary monitored node and providing access request signatures for those system monitor ledgers that are associated with a particular monitoring node to the monitoring node computing entity for the particular monitoring node. In some embodiments, using the ledger-based signature reporting techniques described herein, when a particular monitoring node is associated with L of M primary monitored nodes, where L is less than or equal to M and is typically much less than M, a monitoring node computing entity for the particular monitoring node can perform effective system-wide monitoring using a set of operations that have a computational complexity of O(L).

20 Claims, 11 Drawing Sheets

(56) References Cited

U.S. PATENT DOCUMENTS

| | | | |
|---|---|---|---|
| 2020/0364799 A1 | 11/2020 | Crowe et al. | |
| 2020/0380500 A1 | 12/2020 | Dershem | |
| 2021/0090081 A1 | 3/2021 | Rege et al. | |
| 2021/0105271 A1 | 4/2021 | Nitturkar et al. | |
| 2021/0158451 A1 | 5/2021 | Blazek et al. | |
| 2021/0209956 A1* | 7/2021 | Allouche | G05D 1/0011 |
| 2022/0222622 A1* | 7/2022 | Weidman, IV | G16H 40/20 |
| 2022/0393881 A1* | 12/2022 | Ow | G06Q 20/3678 |
| 2023/0019862 A1* | 1/2023 | Vines | G06F 21/31 |

OTHER PUBLICATIONS

"Blockchain Solutions for Healthcare," EPAM, (6 pages), (online), [Retrieved from the Internet Aug. 11, 2022] <URL: https://www.epam.com/blockchain/healthcare>.

Dunphy, Paul et al. "A First Look at Identity Management Schemes on the Blockchain," IEEE Security & Privacy. vol. 16, No. 4, pp. 20-29, Aug. 6, 2018, DOI: 10.1109/MSP.2018.3111247.

Guest, David. "Decentralised Identity: A Beginner's Guide," Kocho Blog, (3 pages), Jan. 17, 2020, (article, online), [Retrieved from the Internet Aug. 11, 2022] <URL: read://https_kocho.co.uk/?url=https%3A%2F%2Fkocho.co.uk%2Fblog%2Fdecentralised-identity-beginners-guide%2F>.

Hinduja, Akshay et al. "Multicriteria Recommender System for Life Insurance Plans Based on Utility Theory," Indian Journal of Science and Technology, vol. 10, No. 14, pp. 1-8, Apr. 2017, DOI: 10.17485/ijst/2017/v10i14/111376.

Khatoon, Asma. "A Blockchain-Based Smart Contract System for Healthcare Management," Electronics, vol. 9, No. 94, pp. 1-23, Jan. 3, 2020, DOI: 10.3390/electronics9010094.

Landi, Heather, "How Anthem Is Using Blockchain Technology to Free Up Members' Data," (6 pages), Feb. 6, 2021, (article, online), [Retrieved from the Internet Aug. 11, 2022] <URL: https://www.fiercehealthcare.com/tech/how-anthem-using-blockchain-technology-to-free-up-patients-data>.

Wilson, David et al. "Technology and Universal Health Coverage: Examining the Role of Digital Health," Journal of Global Health, vol. 11, No. 16001, Nov. 20, 2021, DOI: 10.7189/jogh.11.16006.

\* cited by examiner

Hello John, find your coverage details

| Payer | Type | SA | OOP |
|---|---|---|---|
| UHC | Primary | $400K | $5K (Deductible) |
| Aetna | Secondary | $300K | $3K (Deductible) |
| Medicare | Tertiary | $200K | $2K (Deductible) |

| Payer | Support Number | Support Email ID | Support link |
|---|---|---|---|
| UHC | XXX | AA | myuhc.com |
| Aetna | YYY | BB | myaetna.com |

1001

Generate OTP Code
1002

23456
(Valid for max 24 hours)

Invalidate last token
1003

FIG. 10

MULTI-NODE SYSTEM MONITORING USING SYSTEM MONITORING LEDGERS FOR PRIMARY MONITORED NODES

BACKGROUND

Various embodiments of the present invention address technical challenges related to network-wide supervision of a multi-node blockchain network and disclose innovative techniques for efficiently and effectively supervising the multi-node blockchain network.

BRIEF SUMMARY

In general, various embodiments of the present invention provide methods, apparatus, systems, computing devices, computing entities, and/or the like for enabling low-bottleneck system-wide monitoring of a multi-node blockchain network by using a service monitoring ledger to describe monitoring nodes associated with a primary monitored node and providing access request signatures for those system monitor ledgers that are associated with a particular monitoring node to the monitoring node computing entity for the particular monitoring node.

In accordance with one aspect, a method is provided. In one embodiment, the method comprises: identifying the system monitoring ledger, wherein: (i) the system monitoring ledger describes a plurality of monitoring nodes, and (ii) each monitoring node is associated with a node-wise ledger block that is added to the system monitoring ledger in response to receiving a monitoring node registration request from a monitoring node computing entity that describes a transactional association between the monitoring node and the primary monitored node; identifying a secondary monitored node ledger access request for a secondary monitored node, wherein: (i) the secondary monitored node ledger access request is received from a secondary monitored node computing entity associated with the secondary monitored node and comprises a temporally-limited access code, and (ii) the temporally-limited access code is associated with a temporal limit period and is generated in response to an access code generation request by a primary monitored node computing entity associated with the primary monitored node; and in response to determining that the secondary monitored node ledger access request is received within the temporal limit period: (i) enabling the secondary monitored node computing entity to access the system monitoring ledger, and (ii) transmitting an access request signature for the secondary monitored node ledger access request to each monitoring node computing entity that is associated with the plurality of monitoring nodes, wherein each monitoring node computing entity is configured to perform one or more anomaly detection operations based at least in part on the access request signature.

In accordance with another aspect, a computer program product is provided. The computer program product may comprise at least one computer-readable storage medium having computer-readable program code portions stored therein, the computer-readable program code portions comprising executable portions configured to: identify the system monitoring ledger, wherein: (i) the system monitoring ledger describes a plurality of monitoring nodes, and (ii) each monitoring node is associated with a node-wise ledger block that is added to the system monitoring ledger in response to receiving a monitoring node registration request from a monitoring node computing entity that describes a transactional association between the monitoring node and the primary monitored node; identify a secondary monitored node ledger access request for a secondary monitored node, wherein: (i) the secondary monitored node ledger access request is received from a secondary monitored node computing entity associated with the secondary monitored node and comprises a temporally-limited access code, and (ii) the temporally-limited access code is associated with a temporal limit period and is generated in response to an access code generation request by a primary monitored node computing entity associated with the primary monitored node; and in response to determining that the secondary monitored node ledger access request is received within the temporal limit period: (i) enable the secondary monitored node computing entity to access the system monitoring ledger, and (ii) transmit an access request signature for the secondary monitored node ledger access request to each monitoring node computing entity that is associated with the plurality of monitoring nodes, wherein each monitoring node computing entity is configured to perform one or more anomaly detection operations based at least in part on the access request signature.

In accordance with yet another aspect, an apparatus comprising at least one processor and at least one memory including computer program code is provided. In one embodiment, the at least one memory and the computer program code may be configured to, with the processor, cause the apparatus to: identify the system monitoring ledger, wherein: (i) the system monitoring ledger describes a plurality of monitoring nodes, and (ii) each monitoring node is associated with a node-wise ledger block that is added to the system monitoring ledger in response to receiving a monitoring node registration request from a monitoring node computing entity that describes a transactional association between the monitoring node and the primary monitored node; identify a secondary monitored node ledger access request for a secondary monitored node, wherein: (i) the secondary monitored node ledger access request is received from a secondary monitored node computing entity associated with the secondary monitored node and comprises a temporally-limited access code, and (ii) the temporally-limited access code is associated with a temporal limit period and is generated in response to an access code generation request by a primary monitored node computing entity associated with the primary monitored node; and in response to determining that the secondary monitored node ledger access request is received within the temporal limit period: (i) enable the secondary monitored node computing entity to access the system monitoring ledger, and (ii) transmit an access request signature for the secondary monitored node ledger access request to each monitoring node computing entity that is associated with the plurality of monitoring nodes, wherein each monitoring node computing entity is configured to perform one or more anomaly detection operations based at least in part on the access request signature.

BRIEF DESCRIPTION OF THE SEVERAL VIEWS OF THE DRAWINGS

Reference will now be made to the accompanying drawings, which are not necessarily drawn to scale, and wherein:

FIG. 10 provides an operational example for updating segment ledgers of a hierarchically-segmented blockchain network in accordance with some embodiments herein.

DETAILED DESCRIPTION

Figure 1:
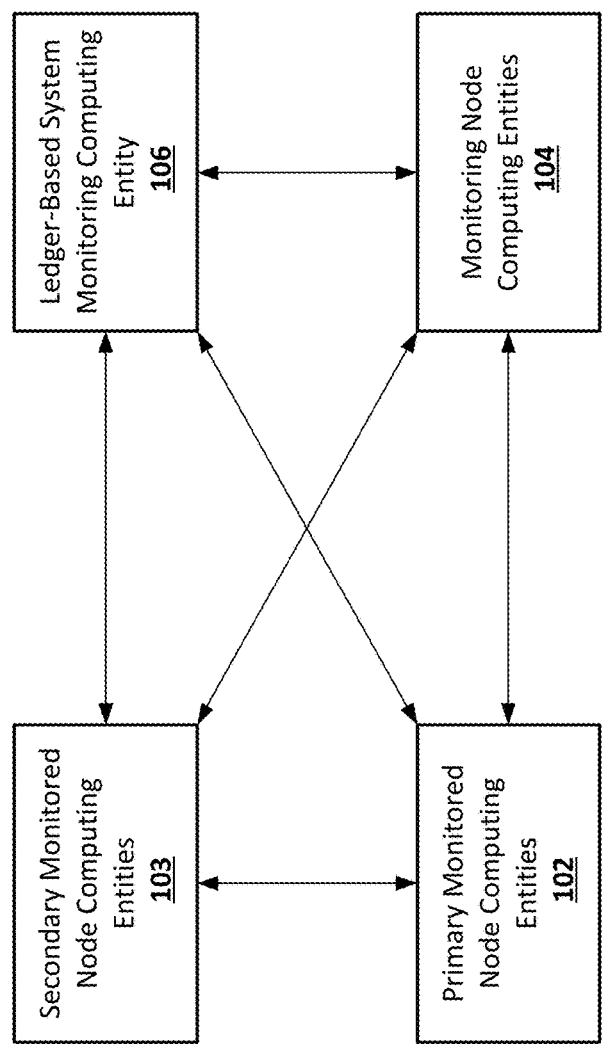
FIG. 1 provides an exemplary overview of an architecture that can be used to practice embodiments of the present invention.

Various embodiments of the present invention now will be described more fully hereinafter with reference to the accompanying drawings, in which some, but not all, embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout. Moreover, while certain embodiments of the present invention are described with reference to a medical service provider/healthcare provider-related blockchain network, one of ordinary skill in the art will recognize that the disclosed concepts can be used in other blockchain networks.

I. Overview and Technical Advantages

Various embodiments of the present invention introduce techniques for efficient and salable monitoring of a multi-node system by using a service monitoring ledger to describe monitoring nodes associated with a primary monitored node. Using a service monitoring ledger to describe monitoring nodes associated with a primary monitored node provides a scalable and efficient way to store transactional association data associated with the primary monitored node. In some embodiments, each monitoring node can execute operations associated with monitoring node registration requests to update a service monitoring ledger that is updated in a distributed manner. This means that the ledger-based system monitoring computing entity 106 can maintain the service monitoring ledger without the need to request any data from the monitoring node computing entities, as in turn the monitoring node computing nodes register into service monitoring ledgers upon detecting transactional associations between their corresponding monitoring nodes and the primary monitored node that is associated with the service monitoring ledger.

In some embodiments, using a service monitoring ledger to maintain transactional associations between a particular primary monitored node and a set of transactionally associated monitoring nodes leads to more efficient use of computational and network resources because it requires fewer number of network transmissions between the ledger-based system monitoring computing entity and monitoring node computing entities. For example, consider an exemplary embodiment in which a multi-node network is associated with P monitoring nodes, where Q of these monitoring nodes are transactionally associated with a particular primary monitored node. In some embodiments, without using the ledger-based techniques described herein, determining transactional associations of the particular primary monitored node would require 2*P network transmissions: P request network transmissions, where each request network transmission is from a central computing entity to a respective monitoring node computing entity to inquire about existence and/or details of transactional associations between the particular primary monitored node and the monitoring node that is associated with the respective monitoring node computing entities, and P response network transmissions, where each response network transmission is a response by a monitoring node computing entity to a request network transmission that is received by the monitoring node computing entity and describes data regarding existence and/or details of transactional associations between the particular primary monitored node and the monitoring node that is associated with the monitoring node computing entity. In contrast, using various ledger-based techniques described herein, determining transactional associations of the particular primary mode would require Q network transmissions, where each network transmission is a monitoring node registration request for a particular monitoring node that is transactionally associated with the particular primary monitored node as transmitted by the monitoring node computing entity for the particular monitoring node to a central computing entity, such as the ledger-based system monitoring computing entity. Because $Q<=2$, then $Q<2*P$, which means that, by using the various ledger-based techniques described herein, the number of network transmissions needed to determine/maintain data about transactional associations between primary monitored nodes and monitoring nodes is decreased, which in turn means using the noted ledger-based techniques leads to more efficient computational/networking resources.

Various embodiments of the present invention introduce techniques for efficient and salable monitoring of a multi-node system by providing access request signatures for those system monitor ledgers that are associated with a particular monitoring node to the monitoring node computing entity for the particular monitoring node. Providing access request signatures for those system monitor ledgers that are associated with a particular monitoring node to the monitoring node computing entity for the particular monitoring node provides an efficient and scalable way of enabling the monitoring node computing entity for the particular monitoring node to perform system-wide monitoring (e.g., system-wide anomaly/fraud detection) of a related segment of a multi-node system that is being monitored by the particular monitored node. In some embodiments, without using the ledger-based signature reporting techniques described herein, given M primary monitored nodes, each monitoring node computing entity needs to receive and analyze system activity data associated with M primary monitored nodes, using a set of operations that have a computational complexity of O(M), to perform effective system-wide monitoring of the multi-node system. In contrast, using the ledger-based signature reporting techniques described herein, when a particular monitoring node is associated with L of the M primary monitored nodes, where L is less than or equal to M and is typically much less than M, a monitoring node computing entity for the particular monitoring node can perform effective system-wide monitoring using a set of operations that have a computational complexity of O(L). Because L is less than or equal to M and is typically much less than M, then for most monitoring node computing entities the computational complexity of performing the system-wide monitoring operation goes down by using the ledger-based signature reporting techniques described herein. In this, by providing access request signatures for those system monitor ledgers that are associated with a particular monitoring node to the monitoring node computing entity for the particular monitoring node, various embodiments of the present invention provide an efficient and scalable way of enabling the monitoring node computing entity for the particular monitoring node to perform system-wide monitoring (e.g., system-wide anomaly/fraud detection) of a related segment of a multi-node system that is being monitored by the particular monitored node.

While various embodiments of the present invention describe using system monitoring ledgers that are updated in a distributed manner but maintained centrally by a ledger-based system monitoring computing entity, a person of ordinary skill in the relevant technology will recognize that system monitoring ledgers may in some embodiments be both modified and maintained in a distributed manner. For example, in some embodiments, each monitoring node computing entity may store/maintain its respective copy of the system monitoring distributed ledger. In these embodiments, in addition to the computational advantages resulting from eliminating the need for maintaining a centralized ledger-based system monitoring computing entity, distributed storage of the system monitoring ledgers enhances the data security and access integrity of the overall multi-node system, as the threat of a major system-wide security breach in the event that the ledger-based system monitoring computing entity is compromised and/or eliminated.

In some embodiments, a set of system monitoring ledgers for a particular primary monitored node are stored both centrally by the ledger-based system monitoring computing entity and in a distributed manner by the monitoring node computing entities. In some of the noted embodiments, to determine whether the system monitoring central ledger that is stored by the system monitoring distributed ledger is accurate/credible: (i) for each monitoring node, the system monitoring distributed ledger that is stored by the monitoring node computing entity for the monitored node is compared to the system monitoring central ledger and, if the two ledgers are identical, a voting score is updated by a weightage score associated with the monitored node (e.g., a constant weightage score, such as a constant weightage score of one, or a weightage score that describes a normalized historical accuracy/credibility of the system monitoring distributed ledgers of the monitored node across a defined historical window, and/or the like), and (ii) if the voting score satisfies a threshold, the system monitoring central ledger is deemed accurate/credible. In some embodiments, if the system monitoring central ledger is determined to be accurate/credible, then all monitoring nodes whose respective monitoring node computing entities store system monitoring distributed ledgers that are non-identical to the system monitoring central ledger are deemed to be comprised and are excluded from the multi-node system.

In some embodiments, the system monitoring ledger is stored as a plurality of system monitoring distributed ledger versions by a group of monitoring node computing entities. In some embodiments, the system monitoring ledger is stored as a system monitoring ledger version by a ledger-based system monitoring computing entity. In some embodiments, the system monitoring ledger is stored as a system monitoring ledger version by a ledger-based system monitoring computing entity, and the system monitoring ledger version is validated using a plurality of system monitoring distributed ledger versions that are stored by a group of monitoring node computing entities.

An exemplary application of various embodiments of the present invention relates to establishing and using a block-chain-based and universal identification for an individual through recording multiple healthcare plan memberships in a distributed ledger, or a blockchain. To establish a universal blockchain-based identification for an individual, ledger entries are added to the distributed ledger by each healthcare payer entity with which the individual enrolls. Then, the individual may use an identification card configured to access the universal blockchain-based identification, and the identification card features separate information access modes for the individual and any healthcare provider. A key benefit of various embodiments of the present invention is a reduction of coordination of benefits costs, with the identification card conveying a universal blockchain-based identification that includes each healthcare plan membership for an individual.

In some embodiments, the following operations are performed: generating a first ledger entry for a distributed ledger for one or more individuals, where the first ledger comprises a universal identifier for each individual; responsive to an individual becoming associated with one or more entities, receiving an appended ledger entry for the distributed ledger from each of the one or more entities, the appended ledger entry configured to indicate an association of the individual with the entity; and provisioning a universal identification card for each of the one or more individuals, where the universal identification card is configured to describe one or more associations of the individual with the one or more entities based at least in part on the universal identifier for the individual.

In some embodiments, the following operations are performed: receiving a universal identification card for an individual, the universal identification card configured with a first access mode for the individual and a second access mode for a card recipient; unlocking the card via the second access mode via a hashed token generated via the first access mode; and using the unlocked card to access data described by the distributed ledger having ledger entries for each association of the individual.

Various embodiments of the present invention disclose storing and maintaining membership data for an individual in a distributed ledger. This membership data may then be described by or accessed via a universal identification card to indicate the membership data to other parties. For instance, according to various embodiments of the present invention, the universal identification card for a patient may be given to a healthcare provider, who may use the universal identification card to access the membership data for the patient with one or more healthcare payer entities. Accordingly, various embodiments of the present invention include aspects related to storing and maintaining membership data for an individual that can be described or accessed by a universal identification card. The below figure provides a general overview of the generation of a universal identification card with membership data according to various embodiments of the present invention.

In some embodiments, an entry is added to a distributed ledger by an individual, and this entry establishes a universal unique ID number for the individual and each of one or more associated individuals (e.g., dependents). The individual or any of the one or more associated individuals may initiate associations with one or more entities. For example, the individual may enroll in a healthcare plan membership with a healthcare payer entity. In doing so, the individual provides the universal unique ID number established by the ledger entry to the entity, upon which the entity generates and adds an appended ledger entry to the distributed ledger using the universal unique ID number. In particular, the appended ledger entry describes the new association of the individual with the entity and is appended to the first ledger entry that establishes the universal unique ID number for the individual. Each new entity that the individual becomes associated with may append additional ledger entries to the distributed ledger, such that the distributed ledger describes each association of the individual along with the universal unique ID number for the individual. With one or more appended ledger entries describing one or more associations of the individual, a universal identification card may be generated. The universal identification card is configured to provide data describing the one or more associations of the individual via the distributed ledger. Thus, with the universal identification card, membership data for the individual can be accessed and used. The universal identification card is specific to an individual (e.g., John), who may be associated with a universal unique ID number (e.g., A3458). The individual may provide the universal identification card to another party such that the party may become aware of the associations of the individual, such as the memberships of one or more healthcare plans of the individual.

In order to preserve privacy, the universal identification card may be configured with at least two access modes; for example, one access mode may be specific to the individual to which the card belongs, and another access mode may be used by other external parties (e.g., a healthcare provider). In some embodiments, the universal identification card may include two QR codes, for example, for two access modes. The individual may access its own membership data using a first access mode for the individual, and various security and authentication techniques may be used for such. Meanwhile, upon the individual providing the universal identification card to an external party, the external party may use a second access mode with approval from the individual. For example, in some embodiments, the individual may generate a temporary hashed token using the first access mode and provide the temporary hashed token to the external party, whereupon the external party may use the temporary hashed token in addition to other security and authentication techniques to use the second access mode. Whilst in the second access mode, the external party may then access the membership data for the individual with one or more entities. For example, the external party may access the distributed ledger comprising ledger entries for each association of the individual with an entity. In coordination of benefits applications, the external party may be a healthcare provider and may use the universal identification card via the second access mode to determine a primary and secondary healthcare coverage for the individual.

II. Definitions of Certain Terms

The term "primary monitored node" may refer to a data construct that describes a real-world entity and/or a virtual entity whose transactional associations are described by a system monitoring ledger, and who is monitored by a set of corresponding monitoring nodes in that accesses to the system monitoring ledger for the primary monitored entity by secondary monitored entity is reported to the noted corresponding monitoring nodes. In some embodiments, each primary monitored node is associated with a corresponding system monitoring ledger that describes transactional associations between the primary monitored node and the set of monitoring nodes that are associated with the noted primary monitored node. An example of a primary monitored node is an individual, such as a health insurance member. In some embodiments, each individual is associated with a system monitoring ledger that describes transactional associations between the individual and one or more monitoring nodes associated with one or more healthcare payers, where the individual is enrolled in a health insurance plan that is provided by an associated healthcare payer. Accordingly, an example of a transactional association is an association between an individual and a healthcare payer that describes enrollment of the individual in a health insurance plan that is offered by the healthcare payer.

The term "service monitoring ledger" may refer to a data construct that describes, for a corresponding primary monitored node that is transactionally associated with the service monitoring ledger, a set of monitoring nodes that are associated with the noted primary monitored node. For example, when a primary monitored node is associated with an individual, the service monitoring ledger for the primary monitored node describes those healthcare payers that include the individual in their health insurance plans as health insurance plan members. In some embodiments, upon creation in response to a ledger creation request that is generated and transmitted by a primary monitored node computing entity, the service monitoring ledger that is associated with the primary monitored node for the primary monitored node computing entity is associated with an empty set of transactionally associated with monitoring nodes. In some embodiments, as monitoring nodes request to "register" into the service monitoring ledger, the set of transactionally associated monitoring nodes is expanded by adding node-wise ledger blocks for the set of transactionally associated monitoring nodes. In other words, in some embodiments, the ledger-based system monitoring computing entity grants a specialized monitoring privilege to those transactional nodes that are classified as being monitoring nodes, such as a monitoring node can register into a service monitoring ledger and be updated about granted secondary monitored accesses of the service monitoring ledger.

The term "monitoring node registration request" may refer to a data construct that describes a request that is transmitted by a monitoring node computing entity for a respective monitoring node to a ledger-based system monitoring computing entity, where the request may include identifying data associated with a target service monitoring ledger. In some embodiments, a monitoring node registration request includes at least one of one or more identifying fields associated with a primary monitored node for the target service monitoring ledger. For example, the monitoring node registration request may include and/or describe a social security number of an individual that is associated with the target service monitoring ledger. In some embodiments, the monitoring node registration request may include, in addition to the identifying data for the target service monitoring ledger, at least one of the following: (i) identifying data associated with the respective monitoring node for the monitoring node registration request, such as a healthcare payer identifier and/or a healthcare payer name for the healthcare payer that is associated with monitoring node registration request, or (ii) authentication data (e.g., a temporary password, a permeant passcode, a pin number, the output of a monitoring node authentication chaincode program, and/or the like) that is configured to, if validated, demonstrate that the monitored node for the monitoring node registration request is authorized to modify the target service monitoring distribution ledger. For example, in some embodiments, a monitoring node registration request from a computing entity of a healthcare payer may describe a healthcare payer identifier and a passcode for modifying the target service monitoring distribution ledger.

The term "monitoring node" may refer to a data construct that describes a real-world entity and/or a virtual entity that can be transactionally associated with a particular primary monitored node via a node-wise ledger block in the system monitoring ledger for the particular primary monitored node. In some embodiments, when a monitored node is transactionally associated with a primary monitored node via a node-wise ledger block in the system monitoring ledger for the particular primary monitored node, a successful access of the system monitoring ledger by a secondary monitored via a secondary monitored node ledger access request causes a ledger-based system monitoring computing entity to transmit an access request signature for the secondary monitored via a secondary monitored node ledger access request to the monitored node computing entity that is associated with the particular monitored node. For example, given an operational environment in which primary monitored nodes correspond to individuals, secondary monitored nodes correspond to healthcare providers, and monitoring nodes correspond to healthcare payers, a particular healthcare payer may be configured to generate and transmit a monitoring node registration request that registers the particular healthcare payer as a health insurance policy provider for a particular individual in a system monitoring ledger for the particular individual. In this example, when a healthcare provider accesses the system monitoring ledger for the particular individual, the ledger-based system monitoring computing entity transmits data describing the noted access to the computing entity associated with the particular healthcare payer, as well as to computing entities associated with all healthcare payers that are registered as healthcare payers for the particular individual in accordance with the system monitoring ledger for the particular individual. Such data may be used to determine that the healthcare provider has checked the coverage details of the particular individual when delivering healthcare services to the particular individual.

The term "node-wise ledger block" may refer to a data construct that describes feature data associated with a recorded transactional association between a corresponding monitoring node and a corresponding service monitoring ledger for a corresponding primary monitored node. Example of such feature data include the monitoring node degree for the corresponding monitoring node, transactional terms (e.g., coverage details/terms/conditions) associated with the transactional relationship, expiration/termination dates (e.g., end-of-policy dates for health insurance policies), and/or the like. In some embodiments, feature data contained in node-wise distribution ledger blocks of a particular service monitoring distribution ledger for a particular primary monitored node can be used, by a secondary monitored computing node that is granted access to the noted node-wise distribution ledger blocks, to determine how to process a transaction associated with the particular primary monitored node. For example, a healthcare provider may use node-wise distribution ledger blocks of the system monitoring ledger for a particular individual to determine health insurance coverage details for the health insurance policies of the particular individual as part of processing a payment for healthcare service delivery with respect to the particular individual.

The term "secondary monitored node" may refer to a data construct that describes a real-world entity and/or a virtual entity that can access a system monitoring ledger associated with a primary monitored node using a temporally-limited access code that is generated by the primary monitored node computing node associated with the primary monitored node. In some embodiments, to access a system monitoring ledger associated with a primary monitored node, a secondary monitored node computing entity generates a secondary monitored node ledger access request that describes the primary monitored node and transmits the secondary monitored node ledger access request to a ledger-based system monitoring computing entity. In some of the noted embodiments, if the ledger-based system monitoring computing entity enables the secondary monitored node computing entity to access the system monitoring ledger, the ledger-based system monitoring computing entity transmits an access request signature associated with the secondary monitored node ledger access request to all of the monitoring node computing entities for all of the monitored nodes that were transactionally associated with the accessed system monitoring ledger. An example of a secondary monitored node is a healthcare provider entity, such as a hospital entity.

The term "secondary monitored node ledger access request" may refer to a data construct that describes a request by a secondary monitored node computing entity for a respective secondary monitored node to access a target system monitoring ledger. In some embodiments, because the secondary monitored node that is associated with the secondary monitored node ledger access request has lower access privileges with respect to the target system monitoring ledger, additional security/authentication/authorization measures are defined before enabling the secondary monitored node computing node to access the target system monitoring ledger. In some embodiments, because the secondary monitored node that is associated with the secondary monitored node ledger access request has a short-term access need with respect to the target system monitoring ledger, the capability of the secondary monitored node to access the system monitoring ledger is temporally limited (i.e., restricted to a particular time unit, such as to a particular time unit after a temporally-limited access code is generated in response to a request by the primary monitored node computing entity for the primary monitored node that is associated with the target system monitoring ledger). For example, in some embodiments, a secondary monitored node computing entity accesses a secondary monitored node ledger access portal for a target system monitoring ledger, which is a software application that enables the secondary monitored computing entity to enter data needed to enable accessing the target system monitoring access ledger. Examples of such data include the secondary monitored node identifier of the corresponding secondary monitored node (e.g., a provider identifier or personal identification number (PIN) of a healthcare provider) and a temporally-limited access code (e.g., a time-limited one-time password (OTP)) that is provided to the secondary monitored node computing entity by a primary monitored node computing entity. In some embodiments, the secondary monitored node computing entity accesses a secondary monitored node ledger access portal by scanning a secondary monitored node machine-readable optical code (e.g., a provider access QR code) on a primary monitored node document (e.g., a health insurance card, such as a virtual health insurance card that is displayable/viewable via a software application) for the primary monitored node. In some embodiments, the primary monitored node document comprises a primary monitored node machine-readable optical label and a secondary monitored node machine-readable optical label. In some embodiments, accessing a secondary monitored node ledger access portal is triggered by scanning a secondary monitored node machine-readable optical label on a primary monitored node document associated with the primary monitored node. In some embodiments, scanning the primary node machine-readable optical label is configured to enable accessing a primary monitored node ledger access portal that enables accessing the system monitoring ledger using a persistent access code.

The term "temporally-limited access code" may refer to a data construct that describes a code that, when provided by a secondary monitored node computing entity during a temporal limit period (i.e., during a defined validity time period) in addition to other required fields for accessing a particular system monitoring ledger (e.g., a secondary monitored node identifier), enables the secondary monitored node computing entity to access the particular system monitoring ledger. In some embodiments, the temporal limit period for a temporally-limited access code is a time period that begins when a time at which the temporally-limited access code is generated (referred to herein as a "generation time" for the temporally-limited access code) and ends at an earlier: (i) time in which the temporally-limited access code is invalidated in response to a temporally-limited access code invalidation request that is provided by an end user of the primary monitored node computing entity for the primary monitored node that is associated with the particular system monitoring ledger (referred to herein as an "invalidation time" for the temporally-limited access code), and (ii) time at which an expiration time period following the generation time for the temporally-limited access code is terminated (referred to here as an "expiration time" for the temporally-limited access code). For example, if the generation time for a temporally-limited access code is May 20, 2022 at 8:14:13 PM and the expiration time period is 24 hours, then the temporal limit period for the temporally-limited access code may start from May 20, 2022 at 8:14:13 PM and end on May 21, 2022 at 8:14:13 PM, unless the end user of the primary monitored node computing entity for the primary monitored node that is associated with the system monitoring ledger indicates, before May 21, 2022, at 8:14:13 PM a desire to invalidate/revoke the temporally-limited access code.

The term "access request signature" may refer to a data construct that describes a representation of a secondary monitored node ledger access request. In some embodiments, when a secondary monitored node ledger access request is accessed in that the corresponding secondary monitored node computing entity is granted access to the target system monitoring ledger, the access request signature for the secondary monitored node ledger access request is transmitted to all of the monitoring node computing entities for those monitoring nodes that are transactionally associated with the target system monitoring ledger. For example, if a system monitoring ledger is associated with a primary healthcare payer and a secondary healthcare payer, upon a successful access by a healthcare provider to the system monitoring ledger, the access request signature for the noted successful access is transmitted to both the computing entity for the primary healthcare payer and the computing entity for the secondary healthcare payer. In some embodiments, an access request signature for a secondary monitored node ledger access request that is associated with a secondary monitored node comprises (e.g., is a combination of) at least one of a secondary monitored node identifier for the secondary monitored node (e.g., a provider identifier for a healthcare identifier), an access request timestamp (e.g., a date timestamp) for the secondary monitored node ledger access request, and a primary monitored node identifier for the primary monitored node (e.g., a unique individual identifier for an individual). For example, in some embodiments, when a secondary monitored node ledger access request is a request by a computing entity associated with a particular healthcare provider to access the system monitoring ledger for a particular individual, the access request signature for the noted request may be generated by appending the provider identifier of the particular healthcare provider, the social security number of the particular individual, and the date in which the request is generated and/or received.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 1 is an example architecture for a multi-node system 100. As depicted in FIG. 1, the multi-node system 100 comprises: (i) a set of primary monitored node computing entities 102, (ii) a set of secondary monitored node computing entities 103, (iii) a set of monitoring node computing entities 104, and (iv) a ledger-based system monitoring computing entity 106.

A primary monitored node computing entity may be associated with a primary monitored node and may be used by the primary monitored node to communicate with the ledger-based system monitoring computing entity 106, the set of secondary monitored node computing entities 103, and/or the set of monitoring node computing entities 104. As further described below, a primary monitored node may describe a real-world entity and/or a virtual entity whose transactional associations are described by a system monitoring ledger that is maintained by the ledger-based system monitoring computing entity 106, and who is monitored by a set of corresponding monitoring nodes in that accesses to the system monitoring ledger for the primary monitored entity by secondary monitored entity is reported to the noted corresponding monitoring nodes. In some embodiments, each primary monitored node is associated with a corresponding system monitoring ledger that describes transactional associations between the primary monitored node and the set of monitoring nodes that are associated with the above-noted primary monitored node.

A secondary monitored node computing entity may be associated with a secondary monitored node and may be used by the secondary monitored node to communicate with the ledger-based system monitoring computing entity 106, the set of primary monitored node computing entities 102, and/or the set of monitoring node computing entities 104. As further described below, a secondary monitored node may describe a real-world entity and/or a virtual entity that can access a system monitoring ledger associated with a primary monitored node using a temporally-limited access code that is generated by the primary monitored node computing node associated with the primary monitored node. In some embodiments, to access a system monitoring ledger associated with a primary monitored node, a secondary monitored node computing entity generates a secondary monitored node ledger access request that describes the primary monitored node and transmits the secondary monitored node ledger access request to the ledger-based system monitoring computing entity 106. In some of the noted embodiments, if the ledger-based system monitoring computing entity 106 enables the secondary monitored node computing entity to access the system monitoring ledger, the ledger-based system monitoring computing entity 106 transmits an access request signature associated with the secondary monitored node ledger access request to all of the monitoring node computing entities for all of the monitored nodes that were transactionally associated with the accessed system monitoring ledger.

A monitoring node computing entity may be associated with a monitoring node and may be used by the monitoring node to communicate with the ledger-based system monitoring computing entity 106, the set of primary monitored node computing entities 102, and/or the set of secondary monitored node computing entities 103. As further described below, a monitoring node may describe a real-world entity and/or a virtual entity that can be transactionally associated with a particular primary monitored node via a node-wise ledger block in the system monitoring ledger for the particular primary monitored node. In some embodiments, when a monitored node is transactionally associated with a primary monitored node via a node-wise ledger block in the system monitoring ledger for the particular primary monitored node, a successful access of the system monitoring ledger by a secondary monitored via a secondary monitored node ledger access request causes the ledger-based system monitoring computing entity 106 to transmit an access request signature for the secondary monitored via a secondary monitored node ledger access request to the monitored node computing entity that is associated with the particular monitored node.

The ledger-based system monitoring computing entity 106 may be configured to, for each primary monitored node that is associated with the multi-node system, maintain a system monitoring ledger that reflects all transactional associations between the primary monitored node and all monitoring entities that are transactionally associated with the primary monitored node. Accordingly, in some embodiments, given M primary monitored nodes, M system monitoring ledgers are maintained. In some embodiments, each system monitoring ledger may be modified by each monitored node of N monitoring nodes via adding node-wise ledger blocks to or removing node-wise ledger blocks from the system monitoring ledger. Accordingly, in some embodiments, the ledger-based system monitoring computing entity 106 may be configured to maintain M system monitoring ledgers, where each system monitoring ledger can be modifiable by N monitoring node computing entities associated with N monitoring nodes. In some of the noted embodiments, by adding a ledger to a system monitoring ledger, a monitoring node computing entity is configured to register the corresponding monitoring node as a responsible party associated with the system monitoring ledger that should receive data about secondary monitored node ledger accesses by secondary monitored node computing entities to the system monitoring ledger.

The ledger-based system monitoring computing entity 106 may further be configured to conditionally enable P secondary monitored nodes to access the system monitoring ledgers that are maintained by the ledger-based system monitoring computing entity 106. In some embodiments, when a secondary monitored node computing entity associated with a secondary monitored node ledger accesses a system monitoring ledger, the ledger-based system monitoring computing entity 106: (i) identifies a set of monitoring nodes that are transactionally associated with the primary monitored node for the system monitoring ledger, and (ii) transmits, to each monitoring node computing node that is associated with the set of monitoring nodes that were identified in (i), data describing the successful access by the secondary monitored node to the system monitoring ledger. In this way, the ledger-based system monitoring computing entity 106 enables monitoring nodes that are transactionally associated with a system monitoring ledger to receive data about accesses to the system monitoring ledger. In some embodiments, the monitoring node computing entities associated with the monitoring nodes can use data about accesses by secondary monitored nodes to system monitoring ledgers to perform anomaly/fraud detection operations, as further described below.

Exemplary Ledger-Based System Monitoring Computing Entity

Figure 2:
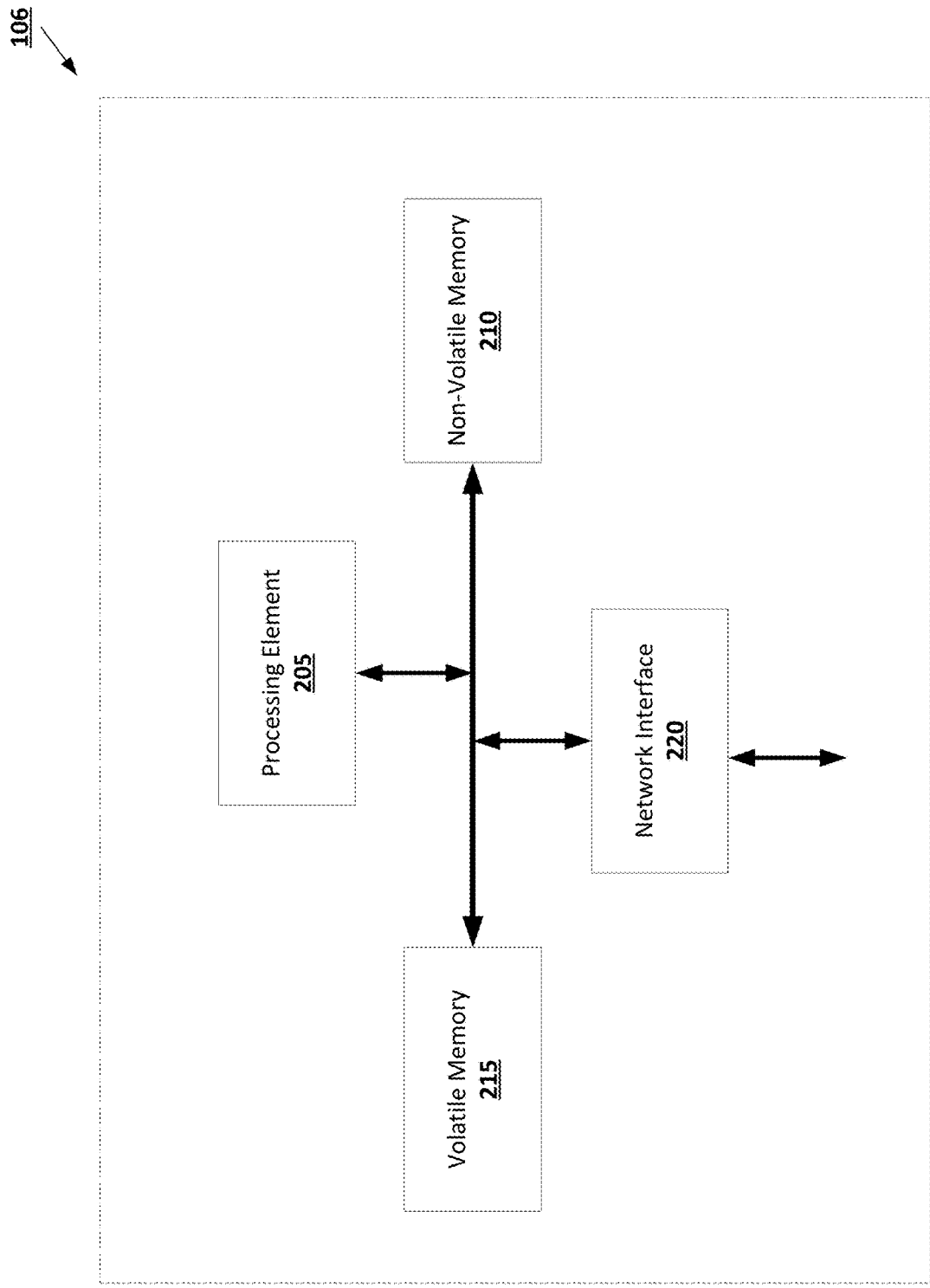
FIG. 2 provides an example ledger-based system monitoring computing entity in accordance with some embodiment discussed herein.

FIG. 2 provides a schematic of a ledger-based system monitoring computing entity 106 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the ledger-based system monitoring computing entity 106 may also include one or more communications interfaces 220 for communicating with various computing entities, such as by communicating data, content, information, and/or similar terms used herein interchangeably that can be transmitted, received, operated on, processed, displayed, stored, and/or the like.

As shown in FIG. 2, in one embodiment, the ledger-based system monitoring computing entity 106 may include, or be in communication with, one or more processing elements 205 (also referred to as processors, processing circuitry, and/or similar terms used herein interchangeably) that communicate with other elements within the ledger-based system monitoring computing entity 106 via a bus, for example.

As will be understood, the processing element 205 may be embodied in a number of different ways.

For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the ledger-based system monitoring computing entity 106 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 210, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the ledger-based system monitoring computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 215, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the ledger-based system monitoring computing entity 106 with the assistance of the processing element 205 and operating system.

As indicated, in one embodiment, the ledger-based system monitoring computing entity 106 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the ledger-based system monitoring computing entity 106 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the ledger-based system monitoring computing entity 106 may include, or be in communication with, one or more input elements, such as a keyboard input, a mouse input, a touch screen/display input, motion input, movement input, audio input, pointing device input, joystick input, keypad input, and/or the like. The ledger-based system monitoring computing entity 106 may also include, or be in communication with, one or more output elements (not shown), such as audio output, video output, screen/display output, motion output, movement output, and/or the like.

Exemplary Primary Monitored Node Computing Entity

Figure 3:
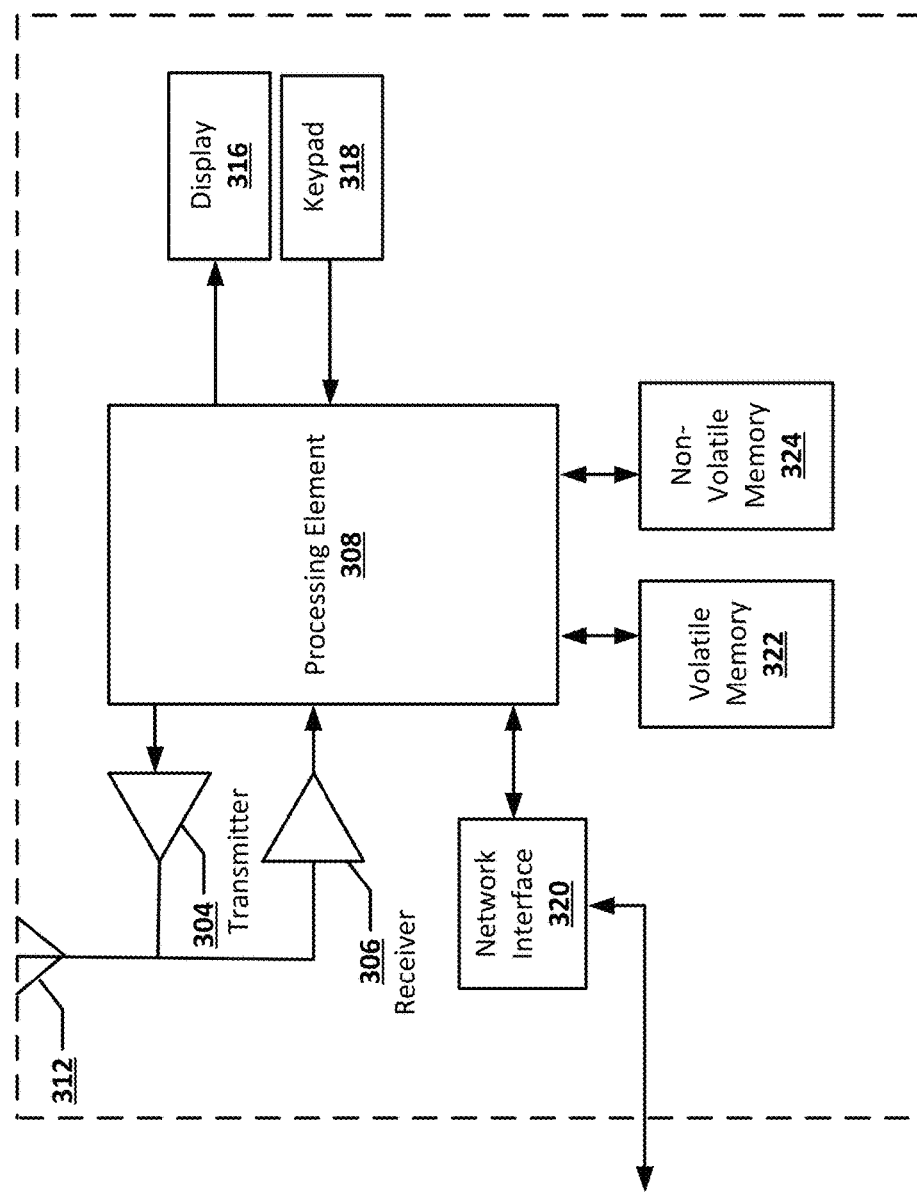
FIG. 3 provides an example primary monitored node computing entity in accordance with some embodiments discussed herein.

FIG. 3 provides an illustrative schematic representative of a primary monitored node computing entity 102 that can be used in conjunction with embodiments of the present invention. In general, the terms device, system, computing entity, entity, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Primary monitored node computing entities 102 can be operated by various parties. As shown in FIG. 3, the primary monitored node computing entity 102 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, correspondingly.

The signals provided to and received from the transmitter 304 and the receiver 306, correspondingly, may include signaling information/data in accordance with air interface standards of applicable wireless systems. In this regard, the primary monitored node computing entity 102 may be capable of operating with one or more air interface standards, communication protocols, modulation types, and access types. More particularly, the primary monitored node computing entity 102 may operate in accordance with any of a number of wireless communication standards and protocols, such as those described above with regard to the ledger-based system monitoring computing entity 106. In a particular embodiment, the primary monitored node computing entity 102 may operate in accordance with multiple wireless communication standards and protocols, such as UMTS, CDMA2000, 1xRTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the primary monitored node computing entity 102 may operate in accordance with multiple wired communication standards and protocols, such as those described above with regard to the ledger-based system monitoring computing entity 106 via a network interface 320.

Via these communication standards and protocols, the primary monitored node computing entity 102 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The primary monitored node computing entity 102 can also download changes, add-ons, and updates, for instance, to its firmware, software (e.g., including executable instructions, applications, program modules), and operating system.

According to one embodiment, the primary monitored node computing entity 102 may include location determining aspects, devices, modules, functionalities, and/or similar words used herein interchangeably. For example, the primary monitored node computing entity 102 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the primary monitored node computing entity's 102 position in connection with a variety of other systems, including cellular towers, Wi-Fi access points, and/or the like. Similarly, the primary monitored node computing entity 102 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The primary monitored node computing entity 102 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the primary monitored node computing entity 102 to interact with and/or cause display of information/data from the ledger-based system monitoring computing entity 106, as described herein. The user input interface can comprise any of a number of devices or interfaces allowing the primary monitored node computing entity 102 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the primary monitored node computing entity 102 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The primary monitored node computing entity 102 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the primary monitored node computing entity 102. As indicated, this may include a user application that is resident on the entity or accessible through a browser or other user interface for communicating with the ledger-based system monitoring computing entity 106 and/or various other computing entities.

In another embodiment, the primary monitored node computing entity 102 may include one or more components or functionality that are the same or similar to those of the ledger-based system monitoring computing entity 106, as described in greater detail above. As will be recognized, these architectures and descriptions are provided for exemplary purposes only and are not limiting to the various embodiments.

In various embodiments, the primary monitored node computing entity 102 may be embodied as an artificial intelligence (AI) computing entity, such as an Amazon Echo, Amazon Echo Dot, Amazon Show, Google Home, and/or the like. Accordingly, the primary monitored node computing entity 102 may be configured to provide and/or receive information/data from a user via an input/output mechanism, such as a display, a camera, a speaker, a voice-activated input, and/or the like. In certain embodiments, an AI computing entity may comprise one or more predefined and executable program algorithms stored within an onboard memory storage module, and/or accessible over a network. In various embodiments, the AI computing entity may be configured to retrieve and/or execute one or more of the predefined program algorithms upon the occurrence of a predefined trigger event.

Exemplary Secondary Monitored Node Computing Entity

Figure 4:
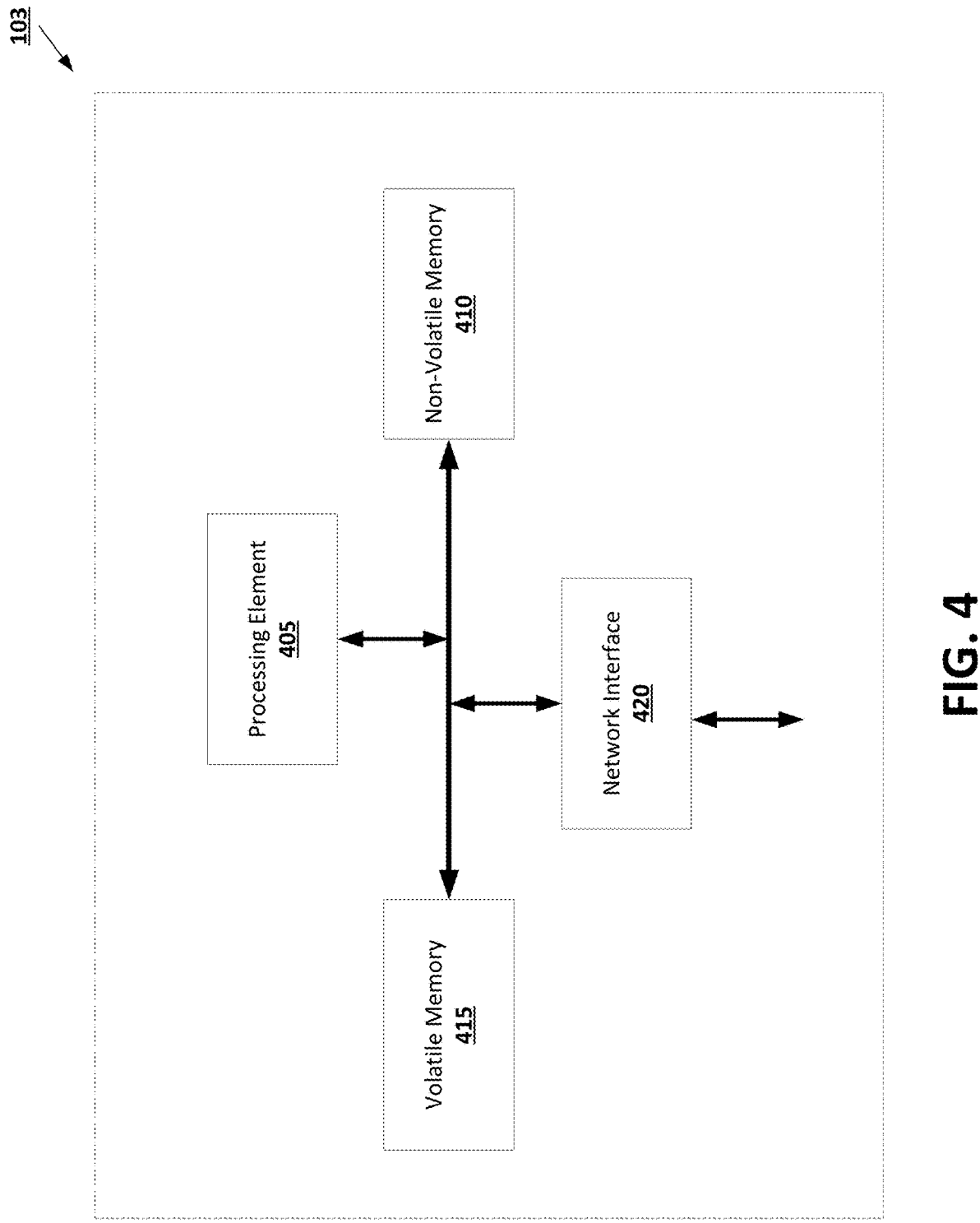
FIG. 4 provides an example secondary monitored node computing entity in accordance with some embodiments discussed herein.

FIG. 4 provides a schematic of a secondary monitored node computing entity 103 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the secondary monitored node computing entity 103 may also include one or more communications interfaces 420 for communicating with various computing entities, such as by communicating data, content, information, and/or similar terms used herein interchangeably that can be transmitted, received, operated on, processed, displayed, stored, and/or the like.

As shown in FIG. 4, in one embodiment, the secondary monitored node computing entity 103 may include, or be in communication with, one or more processing elements 405 (also referred to as processors, processing circuitry, and/or similar terms used herein interchangeably) that communicate with other elements within the secondary monitored node computing entity 103 via a bus, for example. As will be understood, the processing element 405 may be embodied in a number of different ways.

For example, the processing element 405 may be embodied as one or more complex programmable logic devices (CPLDs), microprocessors, multi-core processors, coprocessing entities, application-specific instruction-set processors (ASIPs), microcontrollers, and/or controllers. Further, the processing element 405 may be embodied as one or more other processing devices or circuitry. The term circuitry may refer to an entirely hardware embodiment or a combination of hardware and computer program products. Thus, the processing element 405 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 405 may be configured for a particular use or configured to execute instructions stored in volatile or non-volatile media or otherwise accessible to the processing element 405. As such, whether configured by hardware or computer program products, or by a combination thereof, the processing element 405 may be capable of performing steps or operations according to embodiments of the present invention when configured accordingly.

In one embodiment, the secondary monitored node computing entity 103 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 410, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the secondary monitored node computing entity 103 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 415, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 405. Thus, the databases, database instances, database management systems, data, applications, programs, program modules, scripts, source code, object code, byte code, compiled code, interpreted code, machine code, executable instructions, and/or the like may be used to control certain aspects of the operation of the secondary monitored node computing entity 103 with the assistance of the processing element 405 and operating system.

As indicated, in one embodiment, the secondary monitored node computing entity 103 may also include one or more communications interfaces 420 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOC SIS), or any other wired transmission protocol. Similarly, the secondary monitored node computing entity 103 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the secondary monitored node computing entity 103 may include, or be in communication with, one or more input elements, such as a keyboard input, a mouse input, a touch screen/display input, motion input, movement input, audio input, pointing device input, joystick input, keypad input, and/or the like. The secondary monitored node computing entity 103 may also include, or be in communication with, one or more output elements (not shown), such as audio output, video output, screen/display output, motion output, movement output, and/or the like.

Exemplary Monitoring Node Computing Entity

Figure 5:
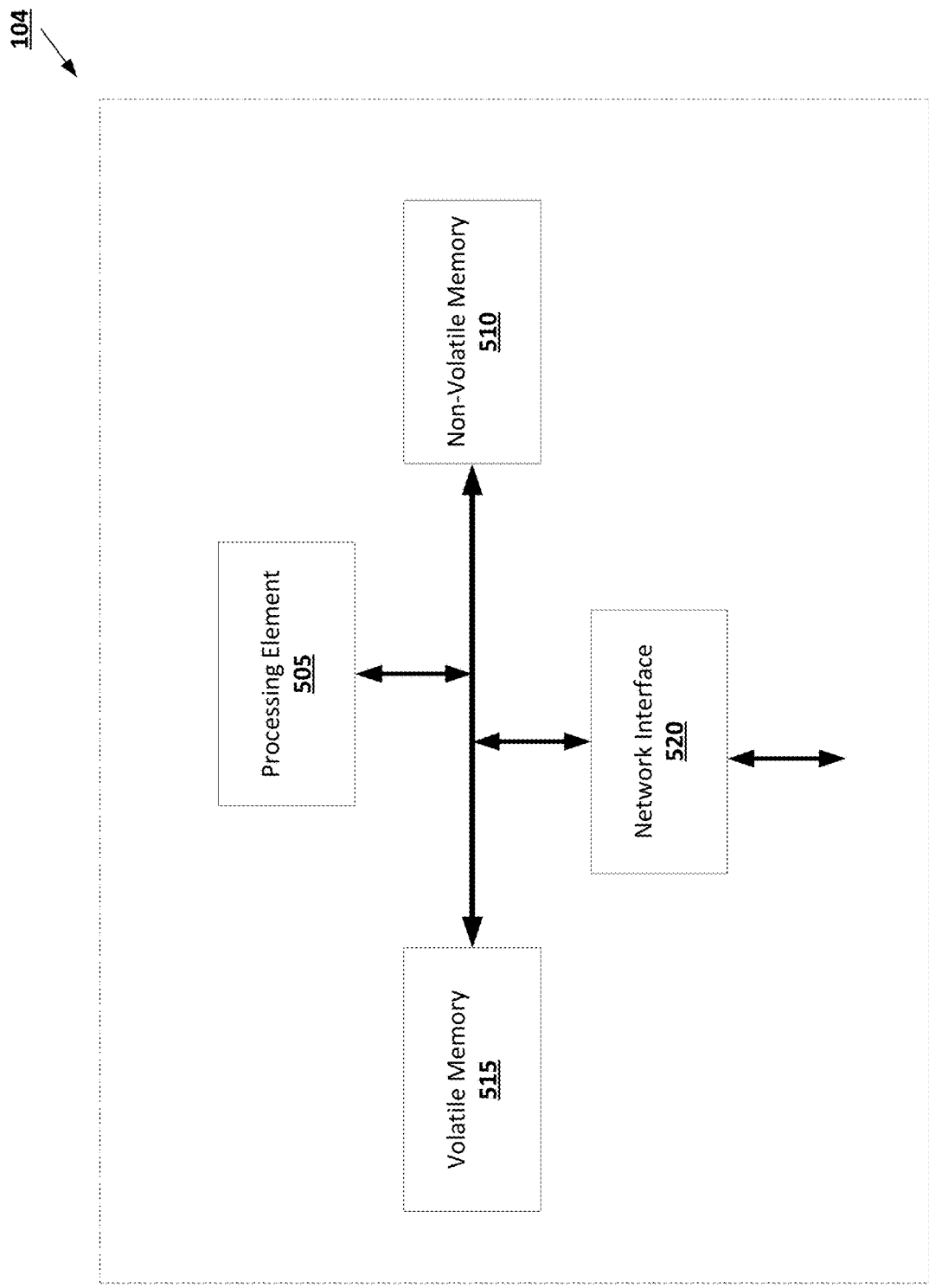
FIG. 5 provides an example monitoring node computing entity in accordance with some embodiments discussed herein.

FIG. 5 provides a schematic of a monitoring node computing entity 104 according to one embodiment of the present invention. In general, the terms computing entity, computer, entity, device, system, and/or similar words used herein interchangeably may refer to, for example, one or more computers, computing entities, desktops, mobile phones, tablets, phablets, notebooks, laptops, distributed systems, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the monitoring node computing entity 104 may also include one or more communications interfaces 520 for communicating with various computing entities, such as by communicating data, content, information, and/or similar terms used herein interchangeably that can be transmitted, received, operated on, processed, displayed, stored, and/or the like.

As shown in FIG. 5, in one embodiment, the monitoring node computing entity 104 may include, or be in communication with, one or more processing elements 505 (also referred to as processors, processing circuitry, and/or similar terms used herein interchangeably) that communicate with other elements within the monitoring node computing entity 104 via a bus, for example. As will be understood, the processing element 505 may be embodied in a number of different ways.

For example, the processing element 505 may be embodied as one or more complex programmable logic devices (CPLDs), microprocessors, multi-core processors, coprocessing entities, application-specific instruction-set processors (ASIPs), microcontrollers, and/or controllers. Further, the processing element 505 may be embodied as one or more other processing devices or circuitry. The term circuitry may refer to an entirely hardware embodiment or a combination of hardware and computer program products. Thus, the processing element 505 may be embodied as integrated circuits, application specific integrated circuits (ASICs), field programmable gate arrays (FPGAs), programmable logic arrays (PLAs), hardware accelerators, other circuitry, and/or the like.

As will therefore be understood, the processing element 505 may be configured for a particular use or configured to execute instructions stored in volatile or non-volatile media or otherwise accessible to the processing element 505. As such, whether configured by hardware or computer program products, or by a combination thereof, the processing element 505 may be capable of performing steps or operations according to embodiments of the present invention when configured accordingly.

In one embodiment, the monitoring node computing entity 104 may further include, or be in communication with, non-volatile media (also referred to as non-volatile storage, memory, memory storage, memory circuitry and/or similar terms used herein interchangeably). In one embodiment, the non-volatile storage or memory may include one or more non-volatile storage or memory media 510, including, but not limited to, hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like.

As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or data that is stored in a computer-readable storage medium using one or more database models, such as a hierarchical database model, network model, relational model, entity-relationship model, object model, document model, semantic model, graph model, and/or the like.

In one embodiment, the ledger-based system monitoring computing entity 106 may further include, or be in communication with, volatile media (also referred to as volatile storage, memory, memory storage, memory circuitry and/or similar terms used herein interchangeably). In one embodiment, the volatile storage or memory may also include one or more volatile storage or memory media 515, including, but not limited to, RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like.

As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 505. Thus, the databases, database instances, database management systems, data, applications, programs, program modules, scripts, source code, object code, byte code, compiled code, interpreted code, machine code, executable instructions, and/or the like may be used to control certain aspects of the operation of the monitoring node computing entity 104 with the assistance of the processing element 505 and operating system.

As indicated, in one embodiment, the monitoring node computing entity 104 may also include one or more communications interfaces 520 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the monitoring node computing entity 104 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol.

Although not shown, the monitoring node computing entity 104 may include, or be in communication with, one or more input elements, such as a keyboard input, a mouse input, a touch screen/display input, motion input, movement input, audio input, pointing device input, joystick input, keypad input, and/or the like. The monitoring node computing entity 104 may also include, or be in communication with, one or more output elements (not shown), such as audio output, video output, screen/display output, motion output, movement output, and/or the like.

V. Example System Operation

Various embodiments of the present invention disclose techniques for maintaining system monitoring ledgers and for using system monitoring ledgers to perform system-wide monitoring of a multi-node system by transmitting access request signatures for successful/granted accesses by secondary monitored node computing entities to system monitoring ledgers. While various embodiments of the present invention describe operations needed for maintaining system monitoring ledgers and operations needed for transmitting access request signatures for successful/granted accesses by secondary monitored node computing entities to system monitoring ledgers as being performed by a single computing entity, a person of ordinary skill in the relevant technology will recognize that in some embodiments the first set of operations may be performed by a first computing entity and the second set of operations may be performed by a second computing entity that is distinct from the first computing entity.

As described below, various embodiments of the present invention introduce techniques for efficient and salable monitoring of a multi-node system by using a service monitoring ledger to describe monitoring nodes associated with a primary monitored node. Using a service monitoring ledger to describe monitoring nodes associated with a primary monitored node provides a scalable and efficient way to store transactional association data associated with the primary monitored node. In some embodiments, each monitoring node can execute operations associated with monitoring node registration requests to update a service monitoring ledger that is updated in a distributed manner. This means that the ledger-based system monitoring computing entity 106 can maintain the service monitoring ledger without the need to request any data from the monitoring node computing entities, as in turn the monitoring node computing nodes register into service monitoring ledgers upon detecting transactional associations between their corresponding monitoring nodes and the primary monitored node that is associated with the service monitoring ledger.

As further described below, various embodiments of the present invention introduce techniques for efficient and salable monitoring of a multi-node system by providing access request signatures for those system monitor ledgers that are associated with a particular monitoring node to the monitoring node computing entity for the particular monitoring node. Providing access request signatures for those system monitor ledgers that are associated with a particular monitoring node to the monitoring node computing entity for the particular monitoring node provides an efficient and scalable way of enabling the monitoring node computing entity for the particular monitoring node to perform system-wide monitoring (e.g., system-wide anomaly/fraud detection) of a related segment of a multi-node system that is being monitored by the particular monitored node. In some embodiments, without using the ledger-based signature reporting techniques described herein, given M primary monitored nodes, each monitoring node computing entity needs to receive and analyze system activity data associated with M primary monitored nodes, using a set of operations that have a computational complexity of O(M), to perform effective system-wide monitoring of the multi-node system. In contrast, using the ledger-based signature reporting techniques described herein, when a particular monitoring node is associated with L of the M primary monitored nodes, where L is less than or equal to M and is typically much less than M, a monitoring node computing entity for the particular monitoring node can perform effective system-wide monitoring using a set of operations that have a computational complexity of O(L). Because L is less than or equal to M and is typically much less than M, then for most monitoring node computing entities the computational complexity of performing the system-wide monitoring operation goes down by using the ledger-based signature reporting techniques described herein. In this, by providing access request signatures for those system monitor ledgers that are associated with a particular monitoring node to the monitoring node computing entity for the particular monitoring node, various embodiments of the present invention provide an efficient and scalable way of enabling the monitoring node computing entity for the particular monitoring node to perform system-wide monitoring (e.g., system-wide anomaly/fraud detection) of a related segment of a multi-node system that is being monitored by the particular monitored node.

Maintaining System Monitoring Ledgers

Figure 6:
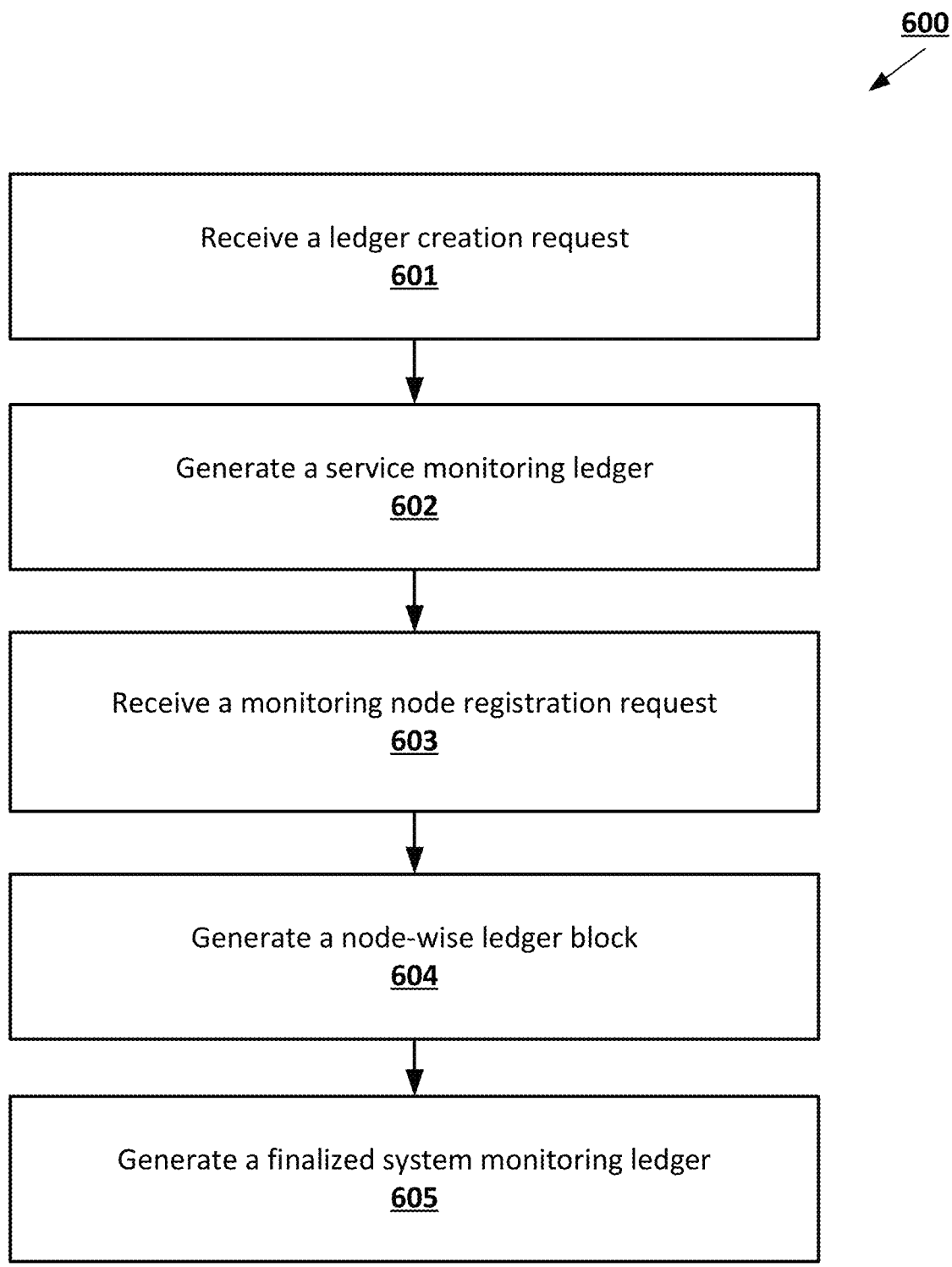
FIG. 6 is a flowchart diagram of an example process for generating a system monitoring ledger for a primary monitored node in accordance with some embodiments discussed herein.

FIG. 6 is a flowchart diagram of an example process 600 for generating a system monitoring ledger for a primary monitored node. Via the various steps/operations of the process 600, the ledger-based system monitoring computing entity 106 can generate a system monitoring ledger that describes transactional associations between primary monitored nodes and monitoring nodes.

The process 600 begins at step/operation 601 when the ledger-based system monitoring computing entity 106 receives, from a primary monitored node computing entity that is associated with the primary monitored node, a ledger creation request. In some embodiments, the ledger creation request describes one or more identifying data fields associated with the primary monitored node. For example, if the primary monitored node is an individual, the ledger creation request may describe at least one of a social security number for the individual, a birth date of the individual, an address of the individual, a name of the individual, and/or the like.

In some embodiments, a primary monitored node may describe a real-world entity and/or a virtual entity whose transactional associations are described by a system monitoring ledger, and who is monitored by a set of corresponding monitoring nodes in that accesses to the system monitoring ledger for the primary monitored entity by secondary monitored entity is reported to the noted corresponding monitoring nodes. In some embodiments, each primary monitored node is associated with a corresponding system monitoring ledger that describes transactional associations between the primary monitored node and the set of monitoring nodes that are associated with the noted primary monitored node. An example of a primary monitored node is an individual, such as a health insurance member. In some embodiments, each individual is associated with a system monitoring ledger that describes transactional associations between the individual and one or more monitoring nodes associated with one or more healthcare payers, where the individual is enrolled in a health insurance plan that is provided by an associated healthcare payer. Accordingly, an example of a transactional association is an association between an individual and a healthcare payer that describes enrollment of the individual in a health insurance plan that is offered by the healthcare payer.

Figure 7:
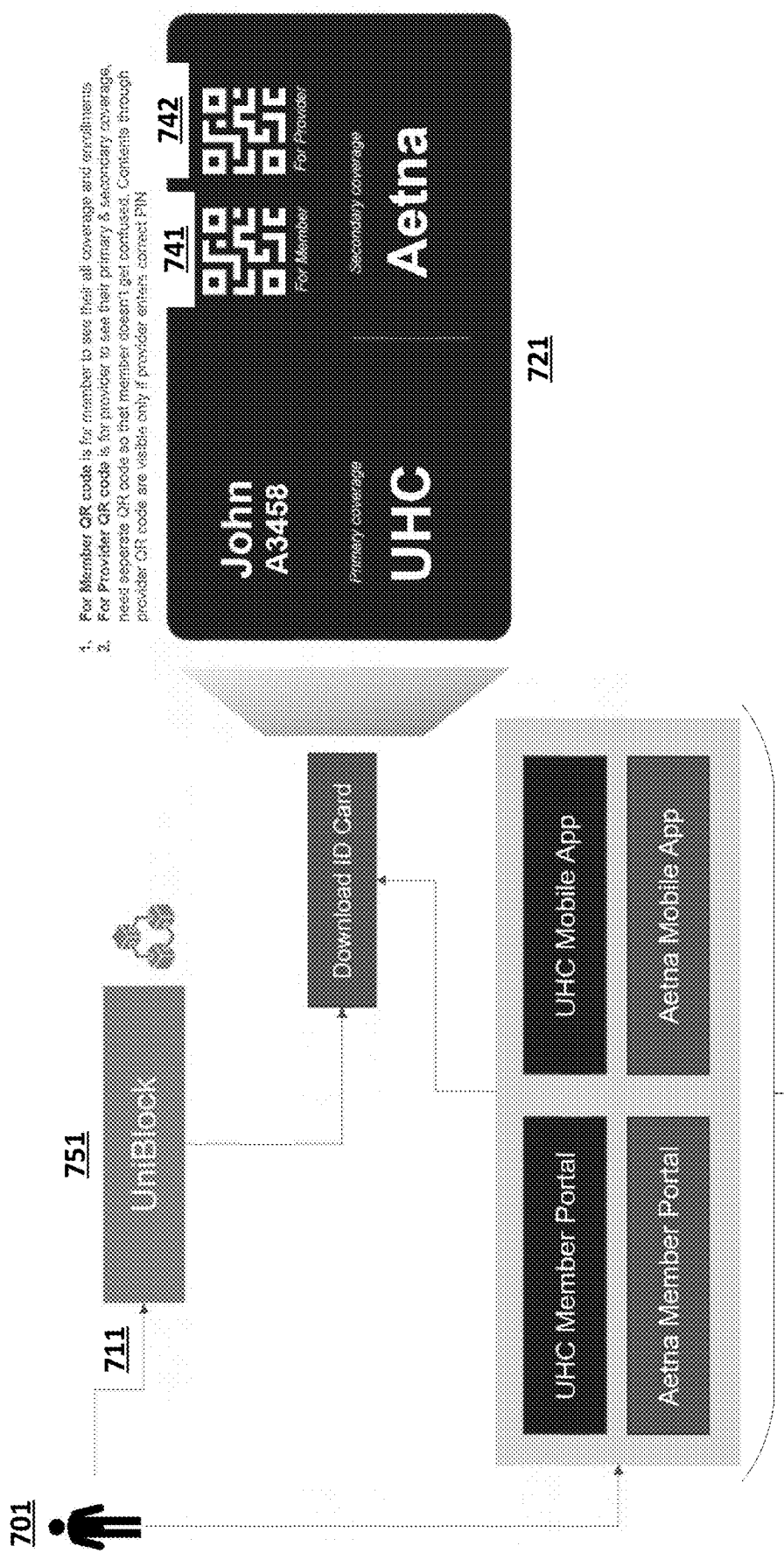
FIG. 7 provides an operational example of an operational lifecycle for a service monitoring ledger in accordance with some embodiments discussed herein.

As described above, the system monitoring ledger associated with a particular primary monitored node may be created via receiving a ledger creation request from the primary monitored node computing entity that is associated with the particular primary monitored node. For example, as depicted in FIG. 7, an individual 701 may use a computing entity to generate and transmit a ledger creation request 711 to the ledger-based system monitoring computing entity 751. As described above, the ledger creation request 711 may contain identifying features associated with the individual 701, such as the social security number of the individual. In some embodiments, each unique individual identifier in a repository of unique individual identifiers may be associated with a unique respective service monitoring ledger, such as querying if the unique individual identifier will retrieve the respective service monitoring ledger for the corresponding individual.

Returning to FIG. 6, at step/operation 602, the ledger-based system monitoring computing entity 106 generates the service monitoring ledger in response to the ledger creation request. As described above, the service monitoring ledger may be configured to describe, for a corresponding primary monitored node that is transactionally associated with the service monitoring ledger, a set of monitoring nodes that are associated with the noted primary monitored node. For example, when a primary monitored node is associated with an individual, the service monitoring ledger for the primary monitored node describes those healthcare payers that include the individual in their health insurance plans as health insurance plan members.

In some embodiments, upon creation in response to a ledger creation request that is generated and transmitted by a primary monitored node computing entity, the service monitoring ledger that is associated with the primary monitored node for the primary monitored node computing entity is associated with an empty set of transactionally associated with monitoring nodes. In some embodiments, as monitoring nodes request to "register" into the service monitoring ledger, the set of transactionally associated monitoring nodes is expanded by adding node-wise ledger blocks for the set of transactionally associated monitoring nodes. In other words, in some embodiments, the ledger-based system monitoring computing entity grants a specialized monitoring privilege to those transactional nodes that are classified as being monitoring nodes, such as a monitoring node can register into a service monitoring ledger and be updated about granted secondary monitored accesses of the service monitoring ledger.

At step/operation 603, the ledger-based system monitoring computing entity 106 receives a monitoring node registration request that is associated with the service monitoring ledger. In some embodiments, the monitoring node registration request identifies one or more identifying fields associated with the service monitoring ledger, such as a social security number of an individual that is associated with the service monitoring ledger.

A monitoring node registration request may be a request that is transmitted by a monitoring node computing entity for a respective monitoring node to a ledger-based system monitoring computing entity, where the request may include identifying data associated with a target service monitoring ledger. In some embodiments, a monitoring node registration request includes at least one of one or more identifying fields associated with a primary monitored node for the target service monitoring ledger. For example, the monitoring node registration request may include and/or describe a social security number of an individual that is associated with the target service monitoring ledger. In some embodiments, the monitoring node registration request may include, in addition to the identifying data for the target service monitoring ledger, at least one of the following: (i) identifying data associated with the respective monitoring node for the monitoring node registration request, such as a healthcare payer identifier and/or a healthcare payer name for the healthcare payer that is associated with a monitoring node registration request, or (ii) authentication data (e.g., a temporary password, a permeant passcode, a pin number, the output of a monitoring node authentication chaincode program, and/or the like) that is configured to, if validated, demonstrate that the monitored node for the monitoring node registration request is authorized to modify the target service monitoring distribution ledger. For example, in some embodiments, a monitoring node registration request from a computing entity of a healthcare payer may describe a healthcare payer identifier and a passcode for modifying the target service monitoring distribution ledger.

In some embodiments, the service monitoring distribution ledger describes a hierarchical monitoring node arrangement that describes, for each monitoring node that is transactionally associated with the service monitoring distribution ledger, a monitoring node degree. For example, the hierarchical monitoring node arrangement may describe, for each healthcare payer that is associated with the service monitoring distribution ledger for a particular individual, a monitoring node degree that describes whether the healthcare payer is a primary healthcare payer for the particular individual or a secondary healthcare payer for the particular individual. In some embodiments, the monitoring node registration request that is associated with a particular monitoring node may describe the assigned/selected monitoring node degree for the particular monitoring node. For example, the monitoring node registration request that is associated with a particular healthcare payer may describe whether the particular healthcare payer should be selected as the primary healthcare payer for a corresponding individual or should be selected as the secondary healthcare payer for a corresponding individual. In some embodiments, when the primary monitored node is an individual and a particular monitoring node is a particular healthcare payer, the monitoring node registration request that is associated with the particular healthcare payer may describe coverage details for a health insurance plan provided by the particular healthcare payer that includes the particular individual as a health insurance member.

As described above, each monitoring node registration request is associated with a respective monitoring node and is generated and transmitted by the monitoring node computing entity for the respective monitoring node. In some embodiments, a monitoring node may describe a real-world entity and/or a virtual entity that can be transactionally associated with a particular primary monitored node via a node-wise ledger block in the system monitoring ledger for the particular primary monitored node. In some embodiments, when a monitored node is transactionally associated with a primary monitored node via a node-wise ledger block in the system monitoring ledger for the particular primary monitored node, a successful access of the system monitoring ledger by a secondary monitored via a secondary monitored node ledger access request causes the ledger-based system monitoring computing entity 106 to transmit an access request signature for the secondary monitored via a secondary monitored node ledger access request to the monitored node computing entity that is associated with the particular monitored node.

For example, given an operational environment in which primary monitored nodes correspond to individuals, secondary monitored nodes correspond to healthcare providers, and monitoring nodes correspond to healthcare payers, a particular healthcare payer may be configured to generate and transmit a monitoring node registration request that registers the particular healthcare payer as a health insurance policy provider for a particular individual in a system monitoring ledger for the particular individual. In this example, when a healthcare provider accesses the system monitoring ledger for the particular individual, the ledger-based system monitoring computing entity 106 transmits data describing the noted access to the computing entity associated with the particular healthcare payer, as well as to computing entities associated with all healthcare payers that are registered as healthcare payers for the particular individual in accordance with the system monitoring ledger for the particular individual. Such data may be used to determine that the healthcare provider has checked the coverage details of the particular individual when delivering healthcare services to the particular individual.

At step/operation 604, in response to receiving the monitoring node registration request that is associated with the particular monitoring node, the ledger-based system monitoring computing entity 106 generates a node-wise ledger block for the particular monitoring node in the service monitoring ledger. A node-wise ledger block may describe feature data associated with a recorded transactional association between a corresponding monitoring node and a corresponding service monitoring ledger for a corresponding primary monitored node. Example of such feature data include the monitoring node degree for the corresponding monitoring node, transactional terms (e.g., coverage details/terms/conditions) associated with the transactional relationship, expiration/termination dates (e.g., end-of-policy dates for health insurance policies), and/or the like. In some embodiments, feature data contained in node-wise distribution ledger blocks of a particular service monitoring distribution ledger for a particular primary monitored node can be used, by a secondary monitored computing node that is granted access to the noted node-wise distribution ledger blocks, to determine how to process a transaction associated with the particular primary monitored node. For example, a healthcare provider may use node-wise distribution ledger blocks of the system monitoring ledger for a particular individual to determine health insurance coverage details for the health insurance policies of the particular individual as part of processing a payment for healthcare service delivery with respect to the particular individual.

Figure 11:
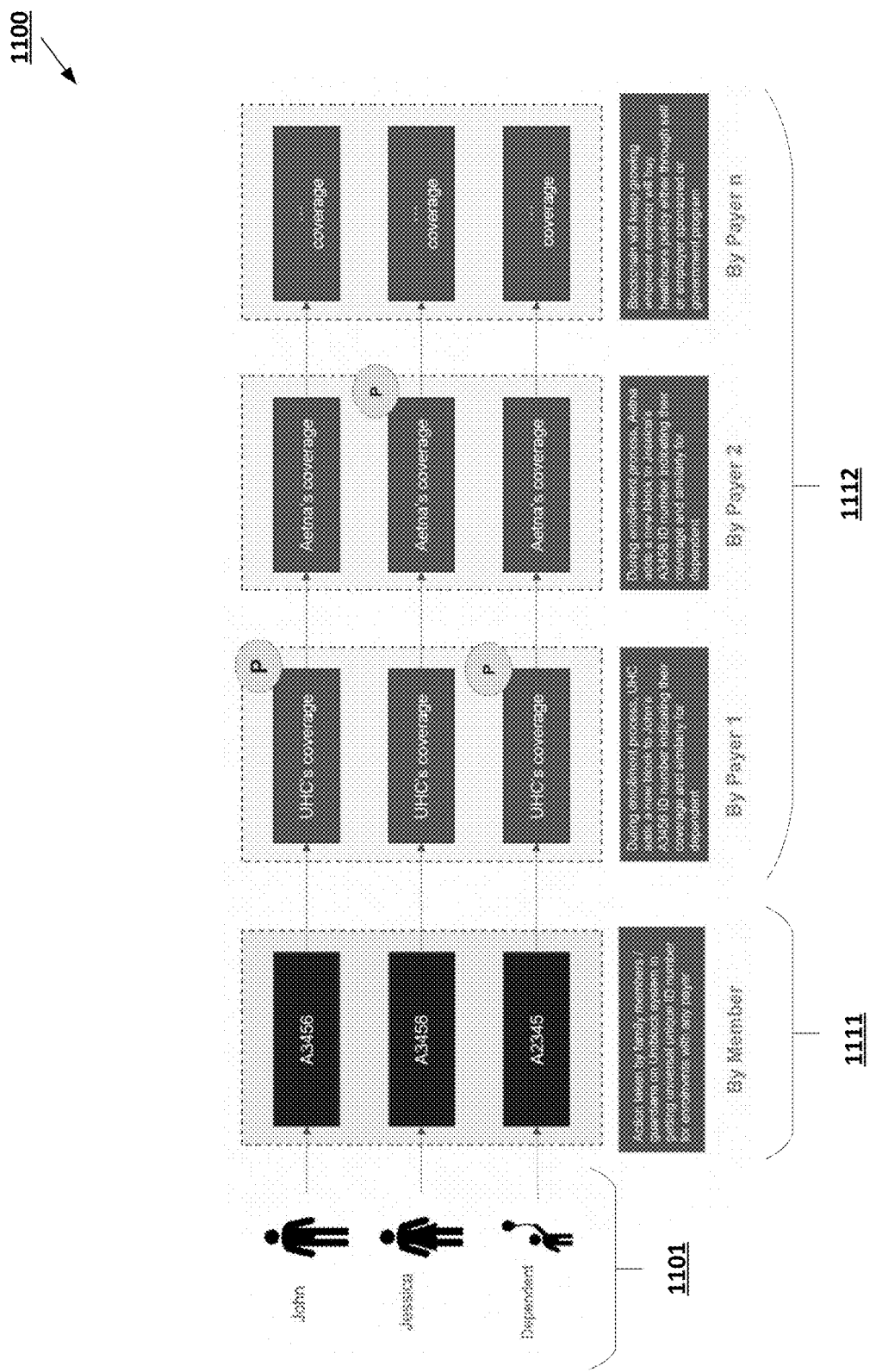
FIG. 11 provides an operational example of generating and updating a service monitoring ledger in accordance with some embodiments discussed herein.

Using a service monitoring ledger to describe monitoring nodes associated with a primary monitored node provides a scalable and efficient way to store transactional association data associated with the primary monitored node. In some embodiments, each monitoring node can execute operations associated with monitoring node registration requests to update a service monitoring ledger that is updated in a distributed manner. This means that the ledger-based system monitoring computing entity 106 can maintain the service monitoring ledger without the need to request any data from the monitoring node computing entities, as in turn the monitoring node computing nodes register into service monitoring ledgers upon detecting transactional associations between their corresponding monitoring nodes and the primary monitored node that is associated with the service monitoring ledger. For example, as depicted in FIG. 11, three service monitoring ledgers associated with three primary monitored nodes 1101 are initially created by the primary monitored nodes 1101 at stage 1111. Then, at stages 1112, the service monitoring ledgers are updated by n monitoring nodes over time by adding node-wise ledger blocks for the monitoring nodes.

In some embodiments, using a service monitoring ledger to maintain transactional associations between a particular primary monitored node and a set of transactionally associated monitoring nodes leads to more efficient use of computational and network resources because it requires a fewer number of network transmissions between the ledger-based system monitoring computing entity and monitoring node computing entities. For example, consider an exemplary embodiment in which a multi-node network is associated with P monitoring nodes, where Q of these monitoring nodes are transactionally associated with a particular primary monitored node. In some embodiments, without using the ledger-based techniques described herein, determining transactional associations of the particular primary monitored node would require 2*P network transmissions: P request network transmissions, where each request network transmission is from a central computing entity to a respective monitoring node computing entity to inquire about existence and/or details of transactional associations between the particular primary monitored node and the monitoring node that is associated with the respective monitoring node computing entities, and P response network transmissions, where each response network transmission is a response by a monitoring node computing entity to a request network transmission that is received by the monitoring node computing entity and describes data regarding existence and/or details of transactional associations between the particular primary monitored node and the monitoring node that is associated with the monitoring node computing entity. In contrast, using various ledger-based techniques described herein, determining transactional associations of the particular primary mode would require Q network transmissions, where each network transmission is a monitoring node registration request for a particular monitoring node that is transactionally associated with the particular primary monitored node as transmitted by the monitoring node computing entity for the particular monitoring node to a central computing entity, such as the ledger-based system monitoring computing entity. Because Q<=2, then Q<2*P, which means that, by using the various ledger-based techniques described herein, the number of network transmissions needed to determine/maintain data about transactional associations between primary monitored nodes and monitoring nodes is decreased, which in turn means using the noted ledger-based techniques leads to more efficient computational/networking resources.

While various embodiments of the present invention describe using system monitoring ledgers that are updated in a distributed manner but maintained centrally by a ledger-based system monitoring computing entity, a person of ordinary skill in the relevant technology will recognize that system monitoring ledgers may in some embodiments be both modified and maintained in a distributed manner. For example, in some embodiments, each monitoring node computing entity may store/maintain its respective copy of the system monitoring distributed ledger. In these embodiments, in addition to the computational advantages resulting from eliminating the need for maintaining a centralized ledger-based system monitoring computing entity, distributed storage of the system monitoring ledgers enhances the data security and access integrity of the overall multi-node system, as the threat of a major system-wide security breach in the event that the ledger-based system monitoring computing entity is compromised and/or eliminated.

In some embodiments, a set of system monitoring ledgers for a particular primary monitored node are stored both centrally by the ledger-based system monitoring computing entity and in a distributed manner by the monitoring node computing entities. In some of the noted embodiments, to determine whether the system monitoring central ledger that is stored by the system monitoring distributed ledger is accurate/credible: (i) for each monitoring node, the system monitoring distributed ledger that is stored by the monitoring node computing entity for the monitored node is compared to the system monitoring central ledger and, if the two ledgers are identical, a voting score is updated by a weightage score associated with the monitored node (e.g., a constant weightage score, such as a constant weightage score of one, or a weightage score that describes a normalized historical accuracy/credibility of the system monitoring distributed ledgers of the monitored node across a defined historical window, and/or the like), and (ii) if the voting score satisfies a threshold, the system monitoring central ledger is deemed accurate/credible. In some embodiments, if the system monitoring central ledger is determined to be accurate/credible, then all monitoring nodes whose respective monitoring node computing entities store system monitoring distributed ledgers that are non-identical to the system monitoring central ledger are deemed to be comprised and are excluded from the multi-node system.

In some embodiments, the system monitoring ledger is stored as a plurality of system monitoring distributed ledger versions by a group of monitoring node computing entities. In some embodiments, the system monitoring ledger is stored as a system monitoring ledger version by a ledger-based system monitoring computing entity. In some embodiments, the system monitoring ledger is stored as a system monitoring ledger version by a ledger-based system monitoring computing entity, and the system monitoring ledger version is validated using a plurality of system monitoring distributed ledger versions that are stored by a group of monitoring node computing entities.

At step/operation 605, subsequent to updating the system monitoring ledger based at least in part on all outstanding monitoring node registration requests, the ledger-based system monitoring computing entity 106 generates a finalized the system monitoring ledger. In some embodiments, once the system monitoring ledger is finalized, a primary monitored node document (e.g., a health insurance card, such as a virtual health insurance card that is displayable/viewable via a software application) is generated that includes a secondary monitored node ledger access portal to enable secondary monitored node computing entities associated with secondary monitored nodes to access data associated with the system monitoring ledger.

An example of a primary monitored node document is the Universal Blockchain (UniBlock) Health Access Card 521 that is depicted in FIG. 7. As depicted in FIG. 7, the individual 701 (being the primary monitored node) can access the UniBlock Health Access Card 721 either through a software application portal by the ledger-based system monitoring computing entity 106, or alternatively through software application portals provided by the set of monitoring node computing entities 731 that are transactionally associated with the individual 701. As further depicted in FIG. 7, the UniBlock Health Access Card 721 depicts the primary healthcare payer and the secondary healthcare payer of the individual 701, as well as two machine-readable optical labels (here, Quick Response (QR) codes): a primary node machine-readable optical label 741 and a secondary node machine-readable optical label 742, which are described in greater detail below.

Performing System-Wide Monitoring

Figure 8:
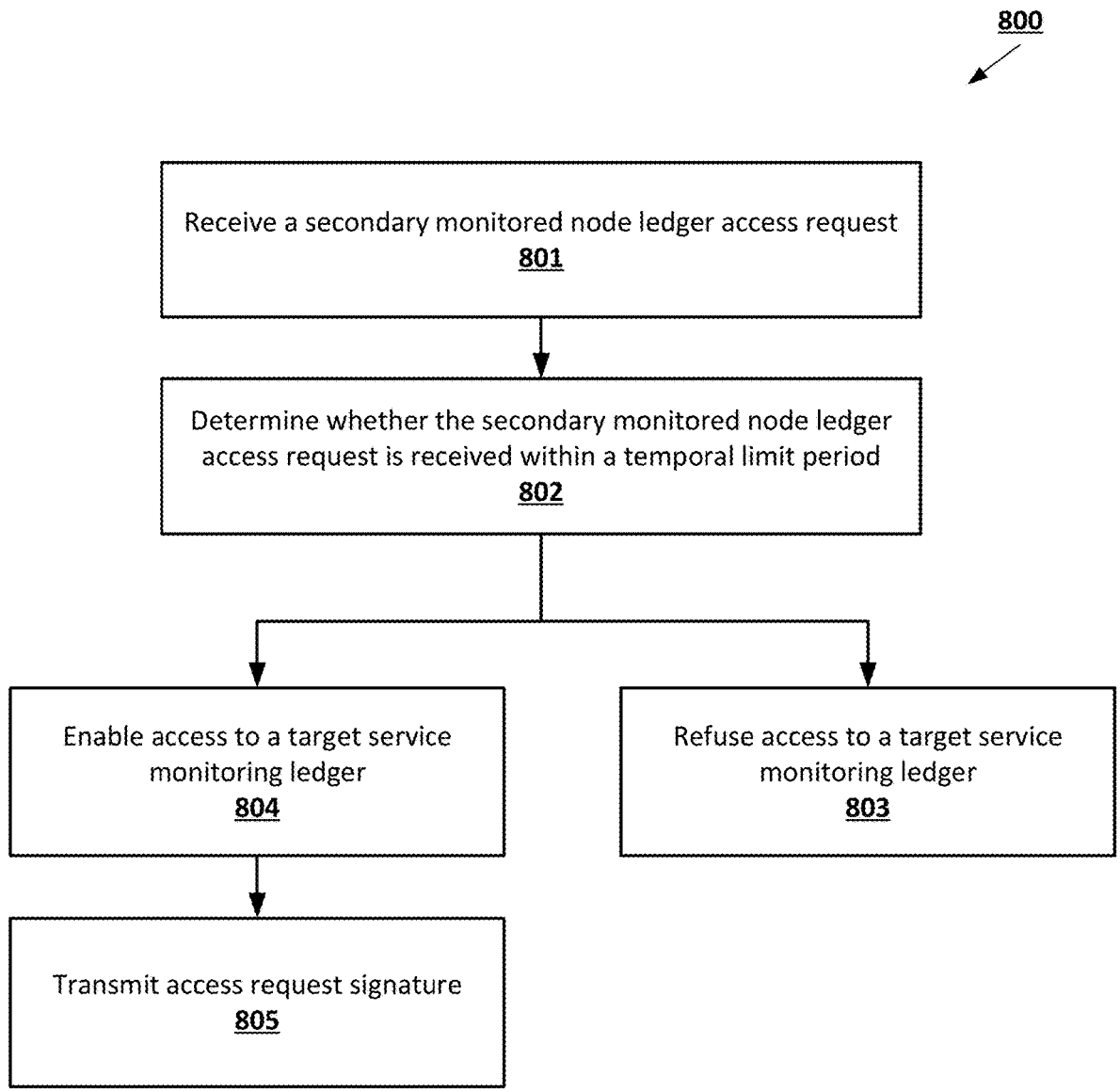
FIG. 8 is a flowchart diagram of an example process for performing system-wide monitoring of a multi-node system using a system monitoring ledger in accordance with some embodiments discussed herein.

FIG. 8 is a flowchart diagram of an example process 800 for performing system-wide monitoring of a multi-node system using a system monitoring ledger. Via the various steps/operations of the process 800, the ledger-based system monitoring computing entity 106 can use successful/granted secondary monitored node ledger access data for a system monitoring ledger to generate reporting data that can be used by monitoring node computing entities that are associated with transactionally associated monitoring nodes for the system monitoring ledger to perform anomaly/fraud detection operations with respect to the multi-node system.

The process 800 begins at step/operation 801 when the ledger-based system monitoring computing entity 106 receives a secondary monitored node ledger access request from a secondary monitored node computing entity for a secondary monitory node. In some embodiments, the secondary monitored node access request describes identifying fields associated with the system monitoring ledger. In some embodiments, the secondary monitored node access request is transmitted when the secondary monitored node computing entity provides a temporally-limited access code using a secondary monitored node ledger access portal that is associated with the system monitoring ledger.

In some embodiments, the secondary monitored node ledger access request is a request by a secondary monitored node computing entity for a respective secondary monitored node to access a target system monitoring ledger. In some embodiments, because the secondary monitored node that is associated with the secondary monitored node ledger access request has lower access privileges with respect to the target system monitoring ledger, additional security/authentication/authorization measures are defined before enabling the secondary monitored node computing node to access the target system monitoring ledger. In some embodiments, because the secondary monitored node that is associated with the secondary monitored node ledger access request has a short-term access need with respect to the target system monitoring ledger, the capability of the secondary monitored node to access the system monitoring ledger is temporally limited (i.e., restricted to a particular time unit, such as to a particular time unit after a temporally-limited access code is generated in response to a request by the primary monitored node computing entity for the primary monitored node that is associated with the target system monitoring ledger).

For example, in some embodiments, a secondary monitored node computing entity accesses a secondary monitored node ledger access portal for a target system monitoring ledger, which is a software application that enables the secondary monitored computing entity to enter data needed to enable accessing the target system monitoring access ledger. Examples of such data include the secondary monitored node identifier of the corresponding secondary monitored node (e.g., a provider identifier of a healthcare provider) and a temporally-limited access code (e.g., a time-limited one-time password (OTP)) that is provided to the secondary monitored node computing entity by a primary monitored node computing entity. In some embodiments, the secondary monitored node computing entity accesses a secondary monitored node ledger access portal by scanning a secondary monitored node machine-readable optical code (e.g., a provider access QR code) on a primary monitored node document (e.g., a health insurance card, such as a virtual health insurance card that is displayable/viewable via a software application) for the primary monitored node. In some embodiments, the primary monitored node document comprises a primary monitored node machine-readable optical label and a secondary monitored node machine-readable optical label. In some embodiments, accessing a secondary monitored node ledger access portal is triggered by scanning a secondary monitored node machine-readable optical label on a primary monitored node document associated with the primary monitored node. In some embodiments, scanning the primary node machine-readable optical label is configured to enable accessing a primary monitored node ledger access portal that enables accessing the system monitoring ledger using a persistent access code (e.g., a non-temporary password that does not have an expiration/invalidation period).

In some embodiments, to generate a secondary monitored node ledger access request for a service monitoring access ledger for a particular primary monitored node, a secondary monitored node computing entity for a respective secondary monitored node is configured to: (i) access a secondary monitored node ledger access portal associated with the primary monitored node, (ii) receive, from the primary monitored node computing entity for the particular primary monitored node, a temporally-limited access code, and (iii) provide a secondary monitored node identifier (e.g., the provider identifier) for the secondary monitored node and the temporally limited access code to the secondary monitored node ledger access portal. In some embodiments, accessing the secondary monitored node ledger access portal is triggered by scanning a secondary monitored node machine-readable optical label on a primary monitored node document associated with the primary monitored node.

Figure 9:
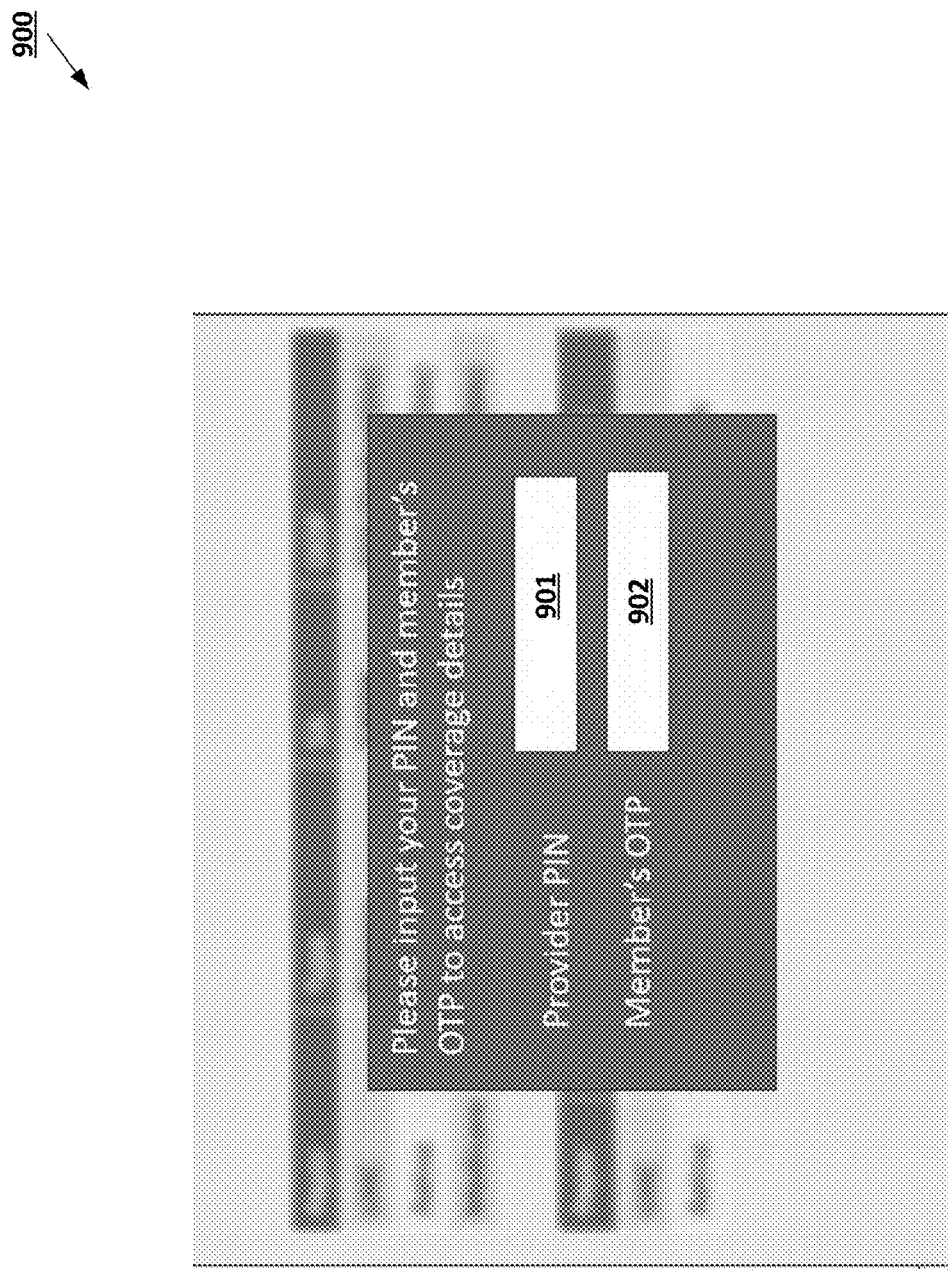
FIG. 9 provides an operational example of a primary monitored node ledger access portal user interface in accordance with some embodiments discussed herein.

An operational example of operations performed by a secondary monitored node computing entity to generate a secondary monitored node ledger access request is depicted in FIG. 9, which depicts a secondary monitored node ledger access portal user interface 900 for a secondary monitored node ledger access portal that is displayed using the secondary monitored node computing entity. In some embodiments, the secondary monitored node ledger access portal user interface 900 is displayed by the secondary monitored node computing entity when a secondary monitored node machine-readable optical label on a primary monitored node document associated with a corresponding primary monitored node (e.g., the secondary node machine-readable optical label 542 of FIG. 5) is scanned. As depicted in FIG. 9, the secondary monitored node ledger access portal user interface 900 enables an end user of the secondary monitored node computing entity to enter: (i) using the user interface element 901, the secondary monitored node identifier (e.g., the provider identifier) for the secondary monitored node that is associated with the secondary monitored node computing entity, and (ii) using the user interface element 902, a temporally-limited access code.

In some embodiments, a temporally-limited access code is a code that, when provided by a secondary monitored node computing entity during a temporal limit period (i.e., during a defined validity time period) in addition to other required fields for accessing a particular system monitoring ledger (e.g., a secondary monitored node identifier), enables the secondary monitored node computing entity to access the particular system monitoring ledger. In some embodiments, the temporal limit period for a temporally-limited access code is a time period that begins when a time at which the temporally-limited access code is generated (referred to herein as a "generation time" for the temporally-limited access code) and ends at an earlier of: (i) a time in which the temporally-limited access code is invalidated in response to a temporally-limited access code invalidation request that is provided by an end user of the primary monitored node computing entity for the primary monitored node that is associated with the particular system monitoring ledger (referred to herein as an "invalidation time" for the temporally-limited access code), and (ii) a time at which an expiration time period following the generation time for the temporally-limited access code is terminated (referred to here as an "expiration time" for the temporally-limited access code). For example, if the generation time for a temporally-limited access code is May 20, 2022 at 8:14:13 PM and the expiration time period is 24 hours, then the temporal limit period for the temporally-limited access code may start from May 20, 2022 at 8:14:13 PM and end on May 21, 2022 at 8:14:13 PM, unless the end user of the primary monitored node computing entity for the primary monitored node that is associated with the system monitoring ledger indicates before May 21, 2022 at 8:14:13 PM a desire to invalidate/revoke the temporally-limited access code.

In some embodiments, the temporally-limited access code for a system monitoring ledger is generated by a primary monitored node computing entity for the primary monitored node that is associated with the system monitoring ledger in response to an access code generation request. In some embodiments, the primary monitored node computing entity for the primary monitored node that is associated with the system monitoring ledger enables generating a temporally-limited access code and invalidating/revoking the temporally-limited access code. In some embodiments, the primary monitored node document for the primary monitored node comprises a primary monitored node machine-readable optical label, where scanning the primary monitored node machine-readable optical label by the primary monitored node computing entity to display a primary monitored node ledger access portal user interface that enables accessing data associated with the system monitoring ledger, generates a temporally-limited monitored access code, and invalidates/revokes the temporally-limited access code. An operational example of such a primary monitored node ledger access portal user interface 1000 is depicted in FIG. 10. As depicted in FIG. 10, the primary monitored node ledger access portal user interface: (i) displays data associated with the system monitoring ledger for the corresponding monitored node using user interface elements 1001, (ii) generates a temporally-limited access code using the user interface element 1002, and (iii) revokes/invalidates the temporally-limited access code using the user interface element 1003. As further depicted in FIG. 10, the expiration time period for a generated temporally-limited access code is 24 hours, such that a generated temporally-limited access code is invalidated 24 hours after generation of the temporally-limited access code, unless the temporally-limited access code is expressly invalidated by end-user commandments using the user interface element 1003. In some embodiments, interaction with the user interface element 1002 causes generation of an access code generation request.

At step/operation 802, the ledger-based system monitoring computing entity 106 determines whether the secondary monitored node ledger access request is received within the temporal limit period for the secondary monitored node ledger access request. In some embodiments, the ledger-based system monitoring computing entity 106 determines whether the secondary monitored node ledger access request is received within the temporal limit period for the secondary monitored node ledger access request based at least in part on whether, at the time of receiving the secondary monitored node ledger access request, the temporally-limited access code that is provided by the secondary monitored node ledger access request is still valid. At step/operation 803, in response to determining that the secondary monitored node ledger access request is received outside the temporal limit period for the secondary monitored node ledger access request, the ledger-based system monitoring computing entity 106 refuses to allow the secondary monitored node computing entity that has provided the secondary monitored node ledger access request to access the service monitoring ledger.

At step/operation 804, in response to determining that the secondary monitored node ledger access request is received within the temporal limit period for the secondary monitored node ledger access request, the ledger-based system monitoring computing entity 106 enables the secondary monitored node computing entity to access the system monitoring ledger. At step/operation 805, in response to determining that the secondary monitored node ledger access request is received within the temporal limit period for the secondary monitored node ledger access request, the ledger-based system monitoring computing entity 106 transmits an access request signature for the secondary monitored node ledger access request to each monitoring node computing entity that is associated with the plurality of monitoring nodes.

In some embodiments, an access request signature is a representation of a secondary monitored node ledger access request. In some embodiments, when a secondary monitored node ledger access request is accessed in that the corresponding secondary monitored node computing entity is granted access to the target system monitoring ledger, the access request signature for the secondary monitored node ledger access request is transmitted to all of the monitoring node computing entities for those monitoring nodes that are transactionally associated with the target system monitoring ledger. For example, if a system monitoring ledger is associated with a primary healthcare payer and a secondary healthcare payer, upon a successful access by a healthcare provider to the system monitoring ledger, the access request signature for the noted successful access is transmitted to both the computing entity for the primary healthcare payer and the computing entity for the secondary healthcare payer.

In some embodiments, an access request signature for a secondary monitored node ledger access request that is associated with a secondary monitored node comprises (e.g., is a combination of) at least one of a secondary monitored node identifier for the secondary monitored node (e.g., a provider identifier for a healthcare identifier), an access request timestamp (e.g., a date timestamp) for the secondary monitored node ledger access request, and a primary monitored node identifier for the primary monitored node (e.g., a unique individual identifier for an individual). For example, in some embodiments, when a secondary monitored node ledger access request is a request by a computing entity associated with a particular healthcare provider to access the system monitoring ledger for a particular individual, the access request signature for the noted request may be generated by appending the provider identifier of the particular healthcare provider, the social security number of the particular individual, and the date in which the request is generated and/or received.

In some embodiments, when a secondary monitored node ledger access request is accessed in that the corresponding secondary monitored node computing entity is granted access to the target system monitoring ledger, the access request signature for the secondary monitored node ledger access request is transmitted to all of the monitoring node computing entities for those monitoring nodes that are transactionally associated with the target system monitoring ledger. Accordingly, in some embodiments, each monitoring node computing entity has an access request signature channel that comprises all access request signatures for all of successful/granted accesses by secondary monitored node computing entities to the service monitoring ledgers that are transactionally associated with the monitoring node for the monitoring node computing entity. For example, the healthcare payer computing entity for a healthcare payer that is the primary healthcare payer for a first individual and the secondary healthcare payer for a second individual is configured to receive access request signatures for successful/granted accesses by healthcare providers to the service monitoring ledger for the first individual and access request signatures for successful/granted accesses by healthcare providers to the service monitoring ledger for the second individual.

In some embodiments, each monitoring node computing entity for a monitoring node is configured to perform anomaly/fraud detection operations based at least in part on the access request signature channel that is maintained by the monitoring node computing entity. In some of the noted embodiments, to perform the anomaly/fraud detection operations, a monitoring node computing entity: (i) retrieves a set of system activity record data objects (e.g., a set of healthcare claim record data objects for a set of healthcare claims) that are associated with the corresponding monitoring node, where each system activity record data object is associated with a respective primary monitored node identifier (e.g., a respective unique individual identifier for an individual that is a health insurance plan member for a health insurance plan offered by the respective healthcare payer monitored node) and a respective secondary monitored node identifier (e.g., a respective healthcare provider identifier for a healthcare provider that has submitted a respective healthcare claim), and (ii) for each system activity record data object: (a) determines an access record indicator that describes whether the access request signature channel that is maintained by the monitoring node computing entity comprises a threshold number of (e.g., one) access record signature that describes a successful/granted access by the secondary monitored node that corresponds to the respective secondary monitored node identifier for the system activity record data object to the system monitoring ledger for the primary monitored node that corresponds to the respective secondary monitored node identifier for the system activity record data object, and (b) in response to determining that the access record indicator for the system activity record data object is an affirmative access record indicator (e.g., an access record indicator that describes that the access request signature channel that is maintained by the monitoring node computing entity comprises the threshold number of access record signature that describes a successful/granted access by the secondary monitored node that corresponds to the respective secondary monitored node identifier for the system activity record data object to the system monitoring ledger for the primary monitored node that corresponds to the respective secondary monitored node identifier for the system activity record data object), determines a negative anomaly/fraud detection score for the system activity record data object that describes that the system activity record data object is likely to be non-anomalous/non-fraudulent. The anomaly/fraud detection score for a system activity record data object may be used individually or in combination with other anomaly/fraud detection to generate a final anomaly/fraud detection determination for the system activity record data object.

For example, in some embodiments, a healthcare payer computing entity may determine that a healthcare claim by a particular healthcare provider about services rendered to a particular individual is likely to be non-anomalous/non-fraudulent if the healthcare payer computing entity has received an access request signature that describes that the computing entity for the particular healthcare provider has accessed the service monitoring ledger for the particular individual, which indicates that the particular healthcare provider has likely generated and transmitted the healthcare after an inquiry into coverage details and various healthcare payer enrollments of the particular individual.

In some embodiments, each monitoring node computing entity for a monitoring node is configured to perform anomaly/fraud detection operations based at least in part on the access request signature channel that is maintained by the monitoring node computing entity. In some of the noted embodiments, to perform the anomaly/fraud detection operations, a monitoring node computing entity: (i) retrieves a set of system activity record data objects (e.g., a set of healthcare claim record data objects for a set of healthcare claims) that are associated with the corresponding monitoring node, where each system activity record data object is associated with a respective primary monitored node identifier (e.g., a respective unique individual identifier for an individual that is a health insurance plan member for a health insurance plan offered by the respective healthcare payer monitored node) and a respective secondary monitored node identifier (e.g., a respective healthcare provider identifier for a healthcare provider that has submitted a respective healthcare claim), and (ii) for each system activity record data object: (a) determines an access record indicator that describes whether the access request signature channel that is maintained by the monitoring node computing entity comprises a threshold number of (e.g., one) access record signature that describes a successful/granted access by the secondary monitored node that corresponds to the respective secondary monitored node identifier for the system activity record data object to the system monitoring ledger for the primary monitored node that corresponds to the respective secondary monitored node identifier for the system activity record data object, and (b) in response to determining that the access record indicator for the system activity record data object is a negative access record indictor (e.g., an access record indictor that describes that the access request signature channel that is maintained by the monitoring node computing entity does not comprise the threshold number of access record signature that describes a successful/granted access by the secondary monitored node that corresponds to the respective secondary monitored node identifier for the system activity record data object to the system monitoring ledger for the primary monitored node that corresponds to the respective secondary monitored node identifier for the system activity record data object), determines an affirmative anomaly/fraud detection score for the system activity record data object that describes that the system activity record data object is likely to be anomalous/fraudulent. The anomaly/fraud detection score for a system activity record data object may be used individually or in combination with other anomaly/fraud detection to generate a final anomaly/fraud detection determination for the system activity record data object.

For example, in some embodiments, a healthcare payer computing entity may determine that a healthcare claim by a particular healthcare provider about services rendered to a particular individual is likely to be anomalous/fraudulent if the healthcare payer computing entity has not received an access request signature that describes that the computing entity for the particular healthcare provider has accessed the service monitoring ledger for the particular individual, which indicates that the particular healthcare provider has likely generated and transmitted the healthcare without an inquiry into coverage details and various healthcare payer enrollments of the particular individual.

In some embodiments, performing one or more anomaly detection operations by a particular monitoring node computing entity comprises: identifying an access request signature channel for the particular monitoring node computing entity, wherein: (i) access request signature channel comprises a plurality of stored access request signatures, and (ii) each stored access request signature is associated with a respective primary monitored node identifier and a respective secondary monitored node identifier; for each system activity record data object that is associated with the monitored node for the particular monitoring node computing entity, determining an access record indicator based at least in part on whether a threshold number of stored access request signatures whose respective primary monitored node identifiers correspond to the primary monitored node for the system activity record data object and whose respective secondary monitored node identifiers correspond to the secondary monitored node for the system activity record data object; and performing the one or more anomaly detection operations based at least in part on each access record indicator.

Providing access request signatures for those system monitor ledgers that are associated with a particular monitoring node to the monitoring node computing entity for the particular monitoring node provides an efficient and scalable way of enabling the monitoring node computing entity for the particular monitoring node to perform system-wide monitoring (e.g., system-wide anomaly/fraud detection) of a related segment of a multi-node system that is being monitored by the particular monitored node. In some embodiments, without using the ledger-based signature reporting techniques described herein, given M primary monitored nodes, each monitoring node computing entity needs to receive and analyze system activity data associated with M primary monitored nodes, using a set of operations that have a computational complexity of O(M), to perform effective system-wide monitoring of the multi-node system. In contrast, using the ledger-based signature reporting techniques described herein, when a particular monitoring node is associated with L of the M primary monitored nodes, where L is less than or equal to M and is typically much less than M, a monitoring node computing entity for the particular monitoring node can perform effective system-wide monitoring using a set of operations that have a computational complexity of O(L). Because L is less than or equal to M and is typically much less than M, then for most monitoring node computing entities the computational complexity of performing a system-wide monitoring operation goes down by using the ledger-based signature reporting techniques described herein. In this, by providing access request signatures for those system monitor ledgers that are associated with a particular monitoring node to the monitoring node computing entity for the particular monitoring node, various embodiments of the present invention provide an efficient and scalable way of enabling the monitoring node computing entity for the particular monitoring node to perform system-wide monitoring (e.g., system-wide anomaly/fraud detection) of a related segment of a multi-node system that is being monitored by the particular monitored node.

CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A computer-implemented method for distributed system-wide monitoring of a multi-node system using a system monitoring ledger, the computer-implemented method comprising:
    identifying, using one or more processors, the system monitoring ledger, wherein: (i) the system monitoring ledger describes a plurality of monitoring nodes, and (ii) each monitoring node of the plurality of monitoring nodes is associated with a node-wise ledger block that is added to the system monitoring ledger in response to receiving a monitoring node registration request from a monitoring node computing entity that describes a transactional association between the monitoring node and a primary monitored node;
    identifying, using the one or more processors, a secondary monitored node ledger access request for a secondary monitored node, wherein: (i) the secondary monitored node ledger access request is received from a secondary monitored node computing entity associated with the secondary monitored node and comprises a temporally-limited access code, and (ii) the temporally-limited access code is associated with a temporal limit period and is generated in response to an access code generation request by a primary monitored node computing entity associated with the primary monitored node; and
    in response to determining that the secondary monitored node ledger access request is received within the temporal limit period:
        enabling, using the one or more processors, the secondary monitored node computing entity to access the system monitoring ledger, and
        transmitting, using the one or more processors, an access request signature for the secondary monitored node ledger access request to each monitoring node computing entity that is associated with the plurality of monitoring nodes, wherein each monitoring node computing entity is configured to perform one or more anomaly detection operations based at least in part on the access request signature.

2. The computer-implemented method of claim 1, wherein:
    the system monitoring ledger further describes a hierarchical monitoring node arrangement, and
    the hierarchical monitoring node arrangement defines, for each monitoring node, a monitoring node degree.

3. The computer-implemented method of claim 1, wherein the access request signature comprises a secondary monitored node identifier for the secondary monitored node, an access request timestamp for the secondary monitored node ledger access request, and a primary monitored node identifier for the primary monitored node.

4. The computer-implemented method of claim 1, wherein generating the secondary monitored node ledger access request comprises:
    accessing, using the secondary monitored node computing entity, a secondary monitored node ledger access portal associated with the primary monitored node;
    receiving, using the secondary monitored node computing entity and from the primary monitored node computing entity, the temporally-limited access code; and
    providing, using the secondary monitored node computing entity, a secondary monitored node identifier for the secondary monitored node and the temporally-limited access code to the secondary monitored node ledger access portal.

5. The computer-implemented method of claim 4, wherein accessing the secondary monitored node ledger access portal is triggered by scanning a secondary monitored node machine-readable optical label on a primary monitored node document associated with the primary monitored node.

6. The computer-implemented method of claim 5, wherein the primary monitored node document comprises the secondary monitored node machine-readable optical label and a primary monitored node machine-readable optical label.

7. The computer-implemented method of claim 6, wherein scanning the primary monitored node machine-readable optical label is configured to enable accessing a primary monitored node ledger access portal that enables accessing the system monitoring ledger using a persistent access code.

8. The computer-implemented method of claim 1, wherein the system monitoring ledger is stored as a plurality of system monitoring distributed ledger versions by a group of monitoring node computing entities.

9. The computer-implemented method of claim 1, wherein:
the system monitoring ledger is stored as a system monitoring ledger version by a ledger-based system monitoring computing entity, and
the system monitoring ledger version is validated using a plurality of system monitoring distributed ledger versions that are stored by a group of monitoring node computing entities.

10. The computer-implemented method of claim 1, wherein performing the one or more anomaly detection operations by a particular monitoring node computing entity comprises:
identifying an access request signature channel for the particular monitoring node computing entity, wherein: (i) the access request signature channel comprises a plurality of stored access request signatures, and (ii) each stored access request signature is associated with a respective primary monitored node identifier and a respective secondary monitored node identifier;
for each system activity record data object that is associated with the monitored node for the particular monitoring node computing entity, determining an access record indicator based at least in part on whether a threshold number of stored access request signatures whose respective primary monitored node identifiers correspond to the primary monitored node for the system activity record data object and whose respective secondary monitored node identifiers correspond to the secondary monitored node for the system activity record data object; and
performing the one or more anomaly detection operations based at least in part on each access record indicator.

11. An apparatus for distributed system-wide monitoring of a multi-node system using a system monitoring ledger, the apparatus comprising one or more processors and at least one memory including program code, the at least one memory and the program code configured to, with the one or more processors, cause the apparatus to at least:
identify the system monitoring ledger, wherein: (i) the system monitoring ledger describes a plurality of monitoring nodes, and (ii) each monitoring node of the plurality of monitoring nodes is associated with a node-wise ledger block that is added to the system monitoring ledger in response to receiving a monitoring node registration request from a monitoring node computing entity that describes a transactional association between the monitoring node and a primary monitored node;
identify a secondary monitored node ledger access request for a secondary monitored node, wherein: (i) the secondary monitored node ledger access request is received from a secondary monitored node computing entity associated with the secondary monitored node and comprises a temporally-limited access code, and (ii) the temporally-limited access code is associated with a temporal limit period and is generated in response to an access code generation request by a primary monitored node computing entity associated with the primary monitored node; and
in response to determining that the secondary monitored node ledger access request is received within the temporal limit period:
enable the secondary monitored node computing entity to access the system monitoring ledger, and
transmit an access request signature for the secondary monitored node ledger access request to each monitoring node computing entity that is associated with the plurality of monitoring nodes, wherein each monitoring node computing entity is configured to perform one or more anomaly detection operations based at least in part on the access request signature.

12. The apparatus of claim 11, wherein:
the system monitoring ledger further describes a hierarchical monitoring node arrangement, and
the hierarchical monitoring node arrangement defines, for each monitoring node, a monitoring node degree.

13. The apparatus of claim 11, wherein the access request signature comprises a secondary monitored node identifier for the secondary monitored node, an access request timestamp for the secondary monitored node ledger access request, and a primary monitored node identifier for the primary monitored node.

14. The apparatus of claim 11, wherein generating the secondary monitored node ledger access request comprises:
accessing, using the secondary monitored node computing entity, a secondary monitored node ledger access portal associated with the primary monitored node;
receiving, using the secondary monitored node computing entity and from the primary monitored node computing entity, the temporally-limited access code; and
providing, using the secondary monitored node computing entity, a secondary monitored node identifier for the secondary monitored node and the temporally-limited access code to the secondary monitored node ledger access portal.

15. The apparatus of claim 14, wherein accessing the secondary monitored node ledger access portal is triggered by scanning a secondary monitored node machine-readable optical label on a primary monitored node document associated with the primary monitored node.

16. The apparatus of claim 15, wherein the primary monitored node document comprises the secondary monitored node machine-readable optical label and a primary monitored node machine-readable optical label.

17. The apparatus of claim 16, wherein scanning the primary node machine-readable optical label is configured to enable accessing a primary monitored node ledger access portal that enables accessing the system monitoring ledger using a persistent access code.

18. The apparatus of claim 11, wherein performing the one or more anomaly detection operations by a particular monitoring node computing entity comprises:
- identifying an access request signature channel for the particular monitoring node computing entity, wherein: (i) the access request signature channel comprises a plurality of stored access request signatures, and (ii) each stored access request signature is associated with a respective primary monitored node identifier and a respective secondary monitored node identifier;
- for each system activity record data object that is associated with the monitored node for the particular monitoring node computing entity, determining an access record indicator based at least in part on whether a threshold number of stored access request signatures whose respective primary monitored node identifiers correspond to the primary monitored node for the system activity record data object and whose respective secondary monitored node identifiers correspond to the secondary monitored node for the system activity record data object; and
- performing the one or more anomaly detection operations based at least in part on each access record indicator.

19. A computer program product for distributed system-wide monitoring of a multi-node system using a system monitoring ledger, the computer program product comprising at least one non-transitory computer-readable storage medium having computer-readable program code portions stored therein, the computer-readable program code portions configured to:
- identify the system monitoring ledger, wherein: (i) the system monitoring ledger describes a plurality of monitoring nodes, and (ii) each monitoring node of the plurality of monitoring nodes is associated with a node-wise ledger block that is added to the system monitoring ledger in response to receiving a monitoring node registration request from a monitoring node computing entity that describes a transactional association between the monitoring node and a primary monitored node;
- identify a secondary monitored node ledger access request for a secondary monitored node, wherein: (i) the secondary monitored node ledger access request is received from a secondary monitored node computing entity associated with the secondary monitored node and comprises a temporally-limited access code, and (ii) the temporally-limited access code is associated with a temporal limit period and is generated in response to an access code generation request by a primary monitored node computing entity associated with the primary monitored node; and
- in response to determining that the secondary monitored node ledger access request is received within the temporal limit period:
  - enable the secondary monitored node computing entity to access the system monitoring ledger, and
  - transmit an access request signature for the secondary monitored node ledger access request to each monitoring node computing entity that is associated with the plurality of monitoring nodes, wherein each monitoring node computing entity is configured to perform one or more anomaly detection operations based at least in part on the access request signature.

20. The computer program product of claim 19, wherein performing the one or more anomaly detection operations by a particular monitoring node computing entity comprises:
- identifying an access request signature channel for the particular monitoring node computing entity, wherein: (i) the access request signature channel comprises a plurality of stored access request signatures, and (ii) each stored access request signature is associated with a respective primary monitored node identifier and a respective secondary monitored node identifier;
- for each system activity record data object that is associated with the monitored node for the particular monitoring node computing entity, determining an access record indicator based at least in part on whether a threshold number of stored access request signatures whose respective primary monitored node identifiers correspond to the primary monitored node for the system activity record data object and whose respective secondary monitored node identifiers correspond to the secondary monitored node for the system activity record data object; and
- performing the one or more anomaly detection operations based at least in part on each access record indicator.

* * * * *

UNITED STATES PATENT AND TRADEMARK OFFICE
CERTIFICATE OF CORRECTION

| | | |
|---|---|---|
| PATENT NO. | : 11,729,084 B1 | Page 1 of 1 |
| APPLICATION NO. | : 17/810490 | |
| DATED | : August 15, 2023 | |
| INVENTOR(S) | : Sudheer Jaisawal | |

It is certified that error appears in the above-identified patent and that said Letters Patent is hereby corrected as shown below:

In the Claims

In Column 42, Line 64, Claim 17, delete "primary node" and insert -- primary monitored node --, therefor.

Signed and Sealed this
Twentieth Day of May, 2025

Coke Morgan Stewart
*Acting Director of the United States Patent and Trademark Office*